Dec. 31, 1968  C. KLEESATTEL ET AL  3,419,776
DEVICES FOR SENSING AND INDICATING VARIATIONS IN FREQUENCY
AND AMPLITUDE OF ACOUSTICALLY VIBRATED WORK MEMBERS
Original Filed June 5, 1963

INVENTORS
CLAUS KLEESATTEL
ARTHUR KURIS
LEWIS BALAMUTH
BY
*Reuben J. Carlson*
Attorney

INVENTORS
CLAUS KLEESATTEL
ARTHUR KURIS
BY LEWIS BALAMUTH

*Reuben J. Carlson*

ATTORNEY

United States Patent Office

3,419,776
Patented Dec. 31, 1968

3,419,776
DEVICES FOR SENSING AND INDICATING VARIATIONS IN FREQUENCY AND AMPLITUDE OF ACOUSTICALLY VIBRATED WORK MEMBERS
Claus Kleesattel, Forest Hills, Arthur Kuris, Riverdale, and Lewis Balamuth, New York, N.Y., assignors to Cavitron Corporation, a corporation of New York
Original application June 5, 1963, Ser. No. 285,629, now Patent No. 3,304,479, dated Feb. 14, 1967. Divided and this application June 15, 1966, Ser. No. 561,673
12 Claims. (Cl. 318—118)

This invention relates to devices for sensing and indicating variations in frequency and amplitude of acoustically vibrated work members, and more particularly to a device for sensing any departure from resonance frequency and maximum amplitude of vibration of a component part of a work performing vibrator unit, and which sensing device may be electrically connected to an indicating instrument which indicates to the machine operator the degree or extent which the work-performing vibrator unit has departed from maximum or peak amplitude during the work-performing operation, and which may be used to guide the operator in manually tuning, or connected into a circuit to automatically tune, the biased high frequency alternating current generator which energizes the vibrator unit, to a frequency which matches the resonance frequency of the vibrator unit. This application is a division of our copending application Ser. No. 285,629 filed June 5, 1963, now Patent No. 3,304,479.

Sensing and indicating devices made in accordance with this invention are particularly designed for association with a vibration transmitting component of a work-performing vibrator unit. Such vibrator units essentially include a piezoelectric, electromagnetic or magnetostrictive transducer; and preferably a magnetostrictive transducer formed from a plurality of stacked laminates of magnetostrictive metal which is energized to vibrate in the longitudinal mode by a high frequency alternating magnetic field which axially permeates the magnetostrictive laminates, as established by a surrounding energizing coil to which biased high frequency alternating current is supplied by an oscillator or generator having frequency tuning means associated therewith. A vibration transmitting line is fixed to one end of the transducer and transmits the vibration engendered in the transducer stack to a work element or tool fixed to or forming a part of the terminal end of the transmission line. The transmission line may consist of one or more connecting bodies or tool holders composed of a metal or material having efficient vibration transmitting capabilities. The connecting body and/or tool holder component of the transmission line may be so shaped, formed and designed as to magnify or reduce the amplitude of longitudinal vibration at the terminal or working end of the transmission line to a substantially higher or lower value, than the amplitude of vibration injected into the input end of the transmission line by the energized transducer. The form, shape and design of such amplitude magnifying and amplitude reducing transmission lines is explained in Patent Re. 25,033.

Work-performing vibrator units such as those above explained, are usually designed to operate at maximum amplitude within a relatively narrow frequency band. Since the amount of work which can be performed by a particular vibrator unit is usually dependent upon its vibration velocity, and since its vibration velocity is a factor determined by the frequency of vibration multiplied by the amplitude of vibration, it is apparent that greatest work is performed when the vibrator unit is energized to operate at resonance frequency which yields maximum amplitude.

However, changes in the vibrating frequency of the vibrator unit often occur during operation, which may be above or below true resonance frequency and maximum amplitude of vibration of the vibrator unit and its work tool, and which departures from resonance frequency may be attributed to various causes such as; a drop in frequency of vibration of the vibrator unit caused by an excessive temperature rise in the transducer which may result from improper cooling of the transducer; a change in the tool holder or tool of different form or mass which may result in a change in the resonance frequency of the vibrator unit; changes in electrical output of the generator which may result from excessive heating or instability of a generator component; or changes in the voltage of the line current supplied to the generator.

It is therefore important to provide some means whereby the frequency or amplitude of vibration of the vibrator unit can be continuously sensed during the work-performing operation, and the sensed frequency and/or amplitude translated by an instrument which indicates to the operator the actual amplitude and frequency performance of the vibrator unit or a component part thereof, and so that departures from maximum amplitude and resonance frequency of the vibrator unit can be corrected by automatically or manually tuning the biased high frequency alternating generator, whose output current energizes the transducer section of the vibrator unit, into frequency match with the resonance frequency of the vibrator unit.

Accordingly, it is an object of the present invention to provide an improved device for sensing and indicating variations in frequency or amplitude of a vibration transmission component of a work-performing vibrator unit, and which device is relatively inexpensive to produce and easily calibrated.

Another object of this invention is to provide an improved device for sensing variations in frequency and amplitude of a vibration transmission component of a work-performing vibrator unit which is not subjected to vibration-induced mechanical failures and is trouble free in operation.

Another object of this invention is to provide an improved device for sensing variations in frequency and amplitude of a vibration transmitting component of a work-performing vibrator unit, and which is so made as to impose a minimum loading on the acoustically vibrated work-performing vibrator unit and the vibration transmitting component thereof to which a part of the device is associated, thereby to avoid any appreciable effect on the acoustic properties of such work-performing vibrator unit.

A further object is to provide an improved sensing device which can be made to generate electric signals of relatively large magnitude suitable for the operation of an amplitude indicating meter, generator tuning means or the like.

A still further object is to provide an improved sensing device which can be designed for operation over a relatively wide frequency and amplitude range.

In accordance with this invention, an amplitude sensing device is provided which includes a magnetostrictive member or element, which is connected to or forms a part of a vibration transmitting component of a work-performing vibrator unit, and into which is injected high frequency vibration whose amplitude of vibration is to be sensed. A pick-up coil of a pick-up assembly extends around the magnetostrictive member or element, and into which an electromotive force is induced in response to stresses produced in the magnetostrictive member or element, as transmitted to the member or element by the vibration transmitting component of the vibrator unit.

Where the vibration transmitting component of the vibrator unit is composed of a magnetostrictive material, or coated or embraced by a magnetostrictive material, a section of the magnetostrictive vibrator unit component, or a section of the magnetostrictive coating or covering applied thereto, may serve as the magnetostrictive element of the sensing device.

Sensing devices made in accordance with this invention may be used in association with work-performing vibrator units operating in the frequency range of 5 kc. to 50 kc. or more. Where the vibrator unit is designed to operate in the frequency range of 40 kc. and above, it may be desirable to make the magnetostrictive element of the sensing device one-half wavelength long, to provide sufficient length for application of the pick-up assembly thereto. However, when the magnetostrictive element is made one-half wavelength long, it is resonant or tuned to the resonant frequency of the vibrator unit, and can only be effectively used when the vibrator unit with which it is associated operates at maximum amplitude over a relatively narrow frequency band. When the vibrator unit is designed to operate in the frequency range in the order of 30 kc. to 40 kc., the magnetostrictive element may have a longitudinal length in the range above one-fourth wavelength but below one-half wavelength at the operating frequency; and when the vibrator unit is designed to operate in the frequency range in the order of 25 kc. to 30 kc., the magnetostrictive element may have a longitudinal length of less than one-quarter wavelength at the operating frequency; and when the vibrator unit is designed to operate at frequency ranges of 20 kc. and below, the magnetostrictive element may have a longitudinal length of approximately one-eighth wavelength or less, at the operating frequency. Magnetostrictive elements of the sensing devices made in accordance with this invention which are less than one-half wavelength long, are non-resonant at the operating frequency, and thus can be effectively used in association with a vibrator unit which operates over a wide frequency band, or can be selectively used with any one of a series of vibrator units which collectively operate over a relatively wide range of frequencies.

The pick-up coil of a sensing device of this invention is wound on a supporting tube or spool formed of non-magnetic and non-conductive material, which is loosely telescoped over the magnetostrictive element and suitably supported in the area of maximum stress in the element. When a magnetostrictive section of a vibration transmitting component of the vibrator unit is used to form a part of the sensing device, the pick-up coil is placed in surrounding spaced relation to the magnetostrictive section and located at a node of longitudinal vibration or a region of maximum stress of the magnetostrictive section thereof.

The electromotive force induced in the surrounding pick-up coil is a function of the amplitude of vibration of the magnetostrictive element or section. Polarization of the magnetostrictive element or section can be effected by an electromagnet, in which case the pick-up coil may be supplied with direct current so that it also acts as the coil of the electromagnet. A permanent magnet is, however, preferably used to polarize the magnetostrictive element, and in which case a permanent magnet ring may be used which is preferably separated from the pick-up coil by a non-magnetic spacer ring or element also loosely telescoped over the magnetostrictive member; and which together provide a desirable pick-up assembly, since in this assembly the electromotive force generated by the pick-up coil may be of sufficient magnitude for the direct operation of an associated amplitude indicating meter or generator tuning means, without amplification of the electromotive force generated by the pick-up coil.

The above, and other objects, features and advantages of the invention, will be apparent from the following detailed description of the invention which is to be read in connection with the accompanying drawings forming a part hereof, and wherein.

Similar reference characters refer to similar parts throughout the several views of the drawings and specification.

Referring to the drawings, the sensing devices made in accordance with this invention are generally designated 10. Each of these sensing devices fundamentally embraces a magnetostrictive section or element generally designated 18, and which is fixed to, or forms a part of, and is vibrated by, a work-performing vibrator unit which may be vibrated at frequencies ranging from about 5 kc. to 50 kc. or more. Each of these sensing devices also embrace a pick-up assembly which includes, a pick-up coil, generally designated 20, which is contained within a support or housing, generally designated 30, with the pick-up coil 20 positioned in surrounding relation to the magnetostrictive section or element 18, and with the housing 30 supported in spaced relation to the vibration transmitting component to which the magnetostrictive member is attached or associated. When the magnetostrictive section or element is vibrated by a vibration transmitting component of the vibrator unit, an alternating voltage is generated in the pick-up coil whose magnitude is influenced by the frequency and amplitude of vibration of the magnetostrictive member, section or element of the sensing device, corresponding to the frequency and amplitude of vibration of a vibrating part or component of the vibrator unit to which it is attached or associated. Throughout this specification letter suffixes have been applied to numerals 10, 18 and 30 to indicate various modifications of these parts of the sensing devices embodied by this invention.

Sensing devices made in accordance with this invention may employ a magnetostrictive section of a vibration transmitting component of the vibrator unit as the vibrated magnetostrictive part of the sensing device, and which is accomplished by making the vibration transmitting component of the vibrator unit entirely or partly of magnetostrictive metal, or by applying a magnetostrictive metal coating to the vibration transmitting component in the area at which the pick-up coil is to be placed. A vibrator assembly having such a sensing device 10e associated therewith is illustrated in FIG. 1.

Figure 1:
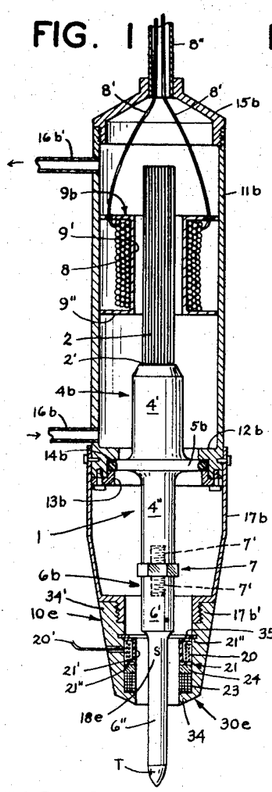
FIG. 1 is a longitudinal sectional view of vibrator assembly whose vibrator unit has a vibration transmitting tool holder made of magnetostrictive material, so that a longitudinal section thereof also serves as the magnetostrictive part of the sensing device, this view further showing the pick-up coil and permanent magnet of the pick-up assembly housed within a nose cone which may be detachably secured to an end extension of the vibrator assembly casing.

The vibrator assembly shown in FIG. 1 essentially comprises a vibrator unit 1 which embraces a transducer stack 2 rigidly bonded at one end thereof by bonding joint 2′ to a half wavelength connecting body 4b having a vibration input section 4′ on one side of its nodal flange 5b of larger mass than the vibration output section 4″ thereof, and so that it operates as a primary amplitude increasing acoustical impedance transformer. The vibration output end of section 4″ may be secured to a detachable vibration transmitting component or tool holder 6b by means of a coupling connection 7 having opposite threaded studs 7′ which are reversely threaded to the vibration output end of the connecting body 4b and the vibration input end of the tool holder 6b. The tool holder 6b, and any form of tool T attached to the output end thereof, have a combined wavelength corresponding approximately to one-half wavelength of sound traveling longitudinally through the material of the tool holder 6b and tool T at the frequency of vibration injected into it by the connecting body 4b. The tool holder 6b may also be designed as a secondary amplitude increasing acoustical impedance transformer by making its vibration input head section 6′ of larger mass than its vibration output stem section 6″. As thus made, the tool holder 6b presents a region of maximum stress S in the area of a node of longitudinal vibration thereof which is adjacent the upper end of its stem section 6″ of reduced cross-section, as indicated in FIG. 1. When the tool holder 6b, or the region of maximum stress therein, is made of magnetostrictive metal or material, that section of the tool holder of reduced diameter and maximum stress may effectively and efficiently provide the magnetostrictive part 18e of the sensing device 10e.

In the illustration shown in FIG. 1, the transducer stack 2 of the vibrator unit 1 is energized to vibrate in the longitiudinal mode by a high frequency magnetic field which axially permeates the transducer, and which field is generated by an energizing coil 8 supported on the tubular body 9′ of a winding supporting spool 9b, and which spool may be provided with end flanges 9″ which confine the energizing winding 8 thereon. The energizing winding 8 and winding supporting spool 9b may be suitably secured to the wall of a surrounding tubular casing 11b which encloses the transducer stack 2 and a part of the connecting body 4b as shown in FIG. 1. The upper end of the casing 11b may be closed by an end closure 15b threadably secured thereto, and the winding leads 8′ extending from the energizing coil 8 may be threaded through a protective sheath 8″, one end of which is fixed to the end closure 15b. The energizing coil 8 is supplied by its winding leads 8′ with biased high frequency alternating current produced by an oscillator generator (see FIGS. 9 and 10). The transducer stack 2 is energized to vibrate in the longitudinal mode by the transducer permeating high frequency magnetic field generated by the winding 8, and which is in turn energized by the oscillator generator.

The lower end of the casing 11b may be provided with an inturned flange portion 12b which has an inwardly projecting shoulder against which a resilient ring or gasket 14b abuts. The gasket 14b also seats within a peripheral groove formed in the nodal flange 5b of the connecting body 4b. An angle shaped retainer ring 13b, removably secured to the underface of the casing rim 12b as by suitable screws, provides support for the resilient gasket 14b and the entire vibrator unit 1. A suitable coolant, such as water, is supplied to the interior chamber of the casing 11b as by an inlet tube 16b and the warmed coolant withdrawn through an outlet tube 16b′, located respectively at the lower and upper ends of the casing 11b. The flow of coolant through the casing 11b maintains the transducer stack 2 and energizing winding 8 in cool and effective operating condition.

Figures 2, 4:
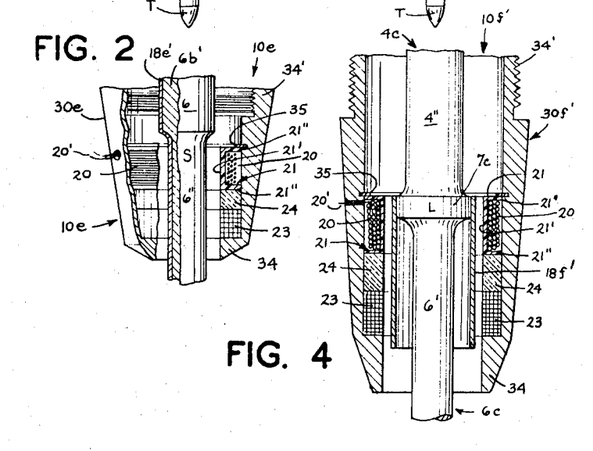
FIG. 2 is a fragmentary elevational view partly in section of a sensing device whose nose cone, pick-up coil and permanent magnet are similar to that shown in FIG. 1, but wherein the vibration transmitting tool holder which extends axially through the nose cone has a coating of magnetostrictive material which serves as the magnetostrictive part or element of this sensing device.
FIG. 4 is an elevational view of a further form of sensing device which includes an elongated nose cone which houses and supports the pick-up coil and permanent magnet, and which provides a pick-up assembly designed for removable attachment to a casing extension of the vibrator assembly shown in FIG. 3, and which sensing device further includes a magnetostrictive tube, one end of which is fixed to and suspended from the vibration output end of the connecting body shown in FIG. 3, and which magnetostrictive tube is surrounded by the pick-up coil and permanent magnet of the pick-up assembly.

The pick-up assembly of the sensing device 10e, as shown in FIGS. 1 and 2, may be suspended from the flange portion 12b of the casing 11b as by means of a tubular suspension sleeve 17b whose upper end is fixed to the exterior of the flange portion 12b of the casing as by suitable screws. The lower end of the suspension sleeve 17b may be provided with an inset rim portion 17b′, and to which the nose cone 30e forming a part of the pick-up assembly of the sensing device 10e may be detachably secured.

Pocketed within the nose cone 30e of this pick-up assembly, as shown in FIGS. 1 and 2, is a pick-up coil 20 supported on the tubular body 21′ and confined within the end flanges 21″ of a spool 21 which is made of a non-magnetic and non-conductive material, and through which the reduced diameter magnetostrictive stem section 6″ of the tool holder 6b loosely extends. The pick-up coil 20 and its supporting spool 21, as shown in FIG. 1, is positioned adjacent a region of maximum vibrational stress S of the magnetostrictive tool holder 6b, so that the magnetostrictive section 18e forms a part of the sensing device 10e. The magnetostrictive section 18c is magnetized by a permanent magnet 23 which is maintained in spaced relation with respect to the coil 20 and its supporting spool 21 by a non-magnetic and non-conductive spacer ring 24. As shown in FIGS. 1 and 2, a nose cone 30e, which provides the housing for the pick-up assembly, should be made of non-conductive material, and presents an inturned shoulder forming end portion 34 as shown in FIG. 1, on which the permanent magnet ring 23 is seated, and which in turn supports the spacer ring 24 and the pick-up coil 20 and its supporting spool 21 thereabove. The upper end of the pick-up coil supporting spool 21 may be locked in position by a resilient expansion ring 35 which overlaps the adjacent flange of the spool 21 and snaps into a circumferential groove formed in the adjacent interior surface of the nose cone housing 30e. The upper end portion 34' of the nose cone housing 30e may be internally threaded for detachable application to the corresponding threaded inset rim portion 17b' of the suspension sleeve 17b. The pick-up leads 20' from the pick-up coil 20 may be threaded through a suitable hole formed in the wall of the nose cone housing 30e, and then connected to a pick-up circuit having an amplitude indicating instrument associated therewith, or the leads 20' may be connected to an automatic tuning circuit which tunes the oscillator generator and maintains the vibrator unit 1 at resonance frequency and maximum amplitude when vibrated.

Since the pick-up assembly of the sensing device 10e shown in FIGS. 1 and 2 is removably supported through the suspension sleeve 17b by the vibrator assembly casing 11b, it may be made of any convenient size, since it imposes no loading on the magnetostrictive vibration transmitting component or tool holder 6b of the vibrator unit. The tool holder 6b or a section thereof 18e is made of a magnetostrictive metal such as nickel, a nickel alloy, permendur, permanickel or the like, and which materials have the requisite high tensile strength and vibration transmitting capabilities. The pick-up assembly as shown in FIGS. 1 and 2, as well as the sleeve 17b from which it is suspended, may be readily removed and replaced to permit removal and replacement of the entire vibrator unit 1 or the tool holder 6b. This sensing device 10e in no way interferes with the effective operation of the vibrator unit 1 and can be manufactured at relatively low cost.

FIG. 2 discloses a nose cone housing 30e, similar to the nose cone housing 30e shown in FIG. 1, which also contains and supports on its inturned shoulder forming end portion 34 the permanent magnet 23, the spacer ring 24 and the supporting spool 21 on which the pick-up coil 20 is wound, locked in position by the snap ring 35. In this modification, the tool holder has a core 6b' which may be shaped similar to the tool holder 6b shown in FIG. 1, and which is made from a material of high tensile strength and vibration transmitting capability but which is not magnetostrictive. The core 6b' has a magnetostrictive coating or covering 18e' plated or otherwise applied thereto. The magnetostrictive coating or plating 18e' is applied at least to the region of maximum stress S of this tool holder and provides the magnetostrictive element or part of this sensing device 10e.

Figure 3:
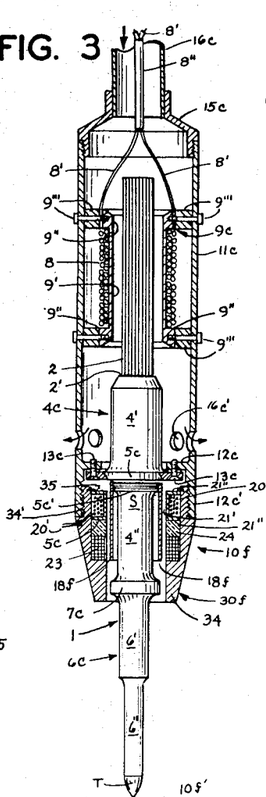
FIG. 3 is a longitudinal section of a modified form of vibrator assembly whose vibrator unit has a vibration transmitting connecting body positioned between the energizing transducer and tool holder of its vibrator unit, with the sensing device in this modification made in the form of a magnetostrictive member of tubular form, one end of which is fixed to and suspended from the connecting body near the nodal region of longitudinal vibration and near a region of maximum stress in the connecting body, this sensing device also embracing a nose cone detachably secured to an end extension of the vibrator assembly casing and which contains and supports the pick-up coil and permanent magnet of the pick-up assembly in surrounding relation to the magnetostrictive tubular member of this sensing device.

Sensing devices made in accordance with this invention also embrace the provision of a magnetostrictive sleeve or tube 18f or 18f', one end of which is secured to a vibration transmitting component 4c of the vibrator unit 1 near a node of longitudinal vibration, or to a vibration transmitting component 4c of the vibrator unit 1 at a loop of longitudinal vibration thereof as shown in FIGS. 3 and 4.

To illustrate this modification, FIGS. 3 and 4 show a vibrator assembly which comprises a vibrator unit 1 which embraces a transducer stack 2 rigidly bonded at one end thereof by bonding joint 2' to a half wavelength connecting body 4c having a vibration input section 4' on one side of its nodal flange 5c of larger mass than the output section 4" thereof, and thus operates as an acoustical impedance transformer which provides primary amplification of the vibrations traveling therethrough at the frequency of vibration of the transducer stack 2. The tool holder 6c which supports the work tool T at the end thereof may be made integral with the connecting body 4c by a boss connection 7c. The tool holder 6c and tool T attached thereto have a combined wavelength approximately corresponding to one-half wavelength of sound traveling longitudinally therethrough, and the tool holder 6c may be designed as an amplitude increasing acoustical impedance transformer by making its vibration input section 6' of larger mass than its vibration output section 6". The connecting body 4c and tool holder 6c shown in FIGS. 3 and 4 joined by an integral boss connection 7c, are made of a material of high tensile strength and vibration transmitting capability, but which material is not magnetostrictive. The section 5c' directly below the nodal flange 5c of the connecting body 4b is of reduced diameter and provides a region of high stress S. As shown in FIG. 3, one end of a magnetostrictive sleeve 18f forming a component of this sensing device 10f, is rigidly secured to the connecting body 4c near the nodal area 5c of longitudinal vibration thereof, as by a threaded connection, or by strong bonding adhesive such as epoxy resin.

As illustrated in FIG. 3, the transducer stack 2 of the vibrator unit 1 is energized to vibrate in the longitudinal mode by a surrounding high frequency alternating magnetic field generated by an energizing coil 8 supported by the tubular body 9' of a winding supporting spool 9c and which spool may be provided with flange portions 9" to confine the energizing winding on the spool. The energizing winding 8 and supporting spool 9c may be supported by the wall of a surrounding tubular housing 11c which encloses the transducer stack 2 and a part of the connecting body 4c as shown in FIG. 3. The means for attaching the winding spool 9c to the casing 11c may comprise spacer washers 9''', and screws which extend through the wall of the casing 11c and spacer washers 9''' and which are screwed into the end flange portions 9" of the supporting spool 9c. Air or other gaseous coolant may thus flow between the spool flange portions 9" and the casing 11c.

The upper end of the casing 11c is closed by a suitable end closure 15c which may be threadably connected for convenient removal to the upper end of the casing 11c. The winding leads 8' from the energizing winding 8 are contained within the protective sheath 8" which extends through a coolant supply tube 16c connected to the end closure 15c. The winding leads 8' are connected to an oscillator generator (see FIGS. 9 and 10) which supplies the biased high frequency alternating current to the energizing winding 8, and which in turn energizes the transducer stack 2. The gaseous coolant supplied by entry supply tube 16c is free to flow around the transducer stack and around the outside of the energizing winding 8, with the warmed coolant discharged through suitable holes 16c' provided in the lower end of the casing 11c.

The lower end of the casing 11c is provided with an inturned rim portion 12c to which the nodal flange 5c of the connecting body 4c may be secured as by suitable screws or bolts 13c which are preferably rubber cushioned to absorb the radial vibrations of the connecting body 4c which occur at the nodal flange. The casing 11c is also provided with a tubular extension 12c' to which a cone-shaped housing 30f or 30f' as shown in FIGS. 3 and 4, and forming a part of the pick-up assembly of this sensing device 10f, is attached.

As shown in FIG. 3, the magnetostrictive sleeve or tube 18f, which is surrounded by the cone-shaped housing 30f, is secured at the upper end thereof to the slightly enlarged but nevertheless reduced diameter section 5c' of the connecting body 4a which is below and spaced from its modal flange 5c so that the sleeve has a longitudinal component of vibration. The magnetostrictive sleeve 18f, which forms a part of the sensing device 10f, may be relatively short in length and need not substantially exceed one inch in length or one-tenth of a wavelength, and except for its upper end, which is secured by a threaded connection or a bonding resin to the reduced diameter section 5c' of the connecting body 4c, is slightly spaced from the vibration output section 4" of the connecting body 4c as shown in FIG. 3. The magnetostrictive sleeve 18f is driven to vibrate in the longitudinal mode by the connecting body 4c to which it is attached, and also exhibits a region of maximum stress at its upper end where it is attached to the reduced diameter section 5c' of the connecting body 4c.

The cone-shaped housing 30f of this sensing device 10f may be made relatively short in length and similar to the cone-shaped housing 30e as shown in FIG. 1, and is provided with an inturned shoulder forming end portion 34 which supports a permanent magnet ring 23. The magnet ring 23 in turn supports a non-magnetic and non-conductive spacer ring 24 and a winding spool 21 around whose tubular body 21' the pick-up coil 20 is wound. A resilient and expansible clamping ring 35 overlaps the upper flange 21" of the winding supporting spool 21 and expands into a circumferential groove formed in the inner surface of the nose cone housing 30f. The upper end of the nose cone housing 30f may be provided with an externally threaded extension 34' which may be detachably connected to the internally threaded tubular extension 12c' of the vibrator assembly casing 11c.

It will be noted that the magnetostrictive sleeve part 18f of this sensing device 10f loosely telescopes through the bore of the tubular body 21' of the pick-up coil supporting spool 21, and through the spacer ring 24 and magnet ring 23 as supported by the cone-shaped housing 30f when its upper end extension 34' of the housing cone 34 is secured to the downwardly extending tubular extension 12c' of the vibrator assembly casing 11c. It will also be noted that the pick-up coil 20 and its supporting spool 21 is positioned adjacent the upper end of the magnetostrictive sleeve 18f in the region of maximum stress therein, since the upper end of the magnetostrictive sleeve 18f is subjected to stress-producing vibrations. These vibrations induce in the pick-up coil 20 an electromotive force corresponding to the frequency and amplitude of the stress-producing vibrations to which the upper end of the magnetostrictive sleeve 18f is subjected. The permanent magnet ring 23 positioned in spaced relation below the pick-up coil 20, magnetizes the magnetostrictive sleeve 18f, with the resultant production of magnetic lines of flux in the magnetostrictive sleeve 18f which flow longitudinally therethrough for substantially the full length thereof. The winding leads 20' extending from the pick-up coil 20 may be threaded through a suitable hole formed in the wall of the nose cone housing 30f as shown in FIG. 3, and which leads 20' are connected to a pick-up circuit which includes an indicating instrument which indicates the amplitude of vibrations of the magnetostrictive sleeve 18f and the connecting body 4c of the vibrator unit 1. Alternatively, the pick-up coil leads 20' may be extended to form a part of a tuning circuit for tuning the biased high frequency alternating current produced by the oscillator generator which energizes the coil 8 of the transducer 2, so that the vibrator unit 1 operates at resonance frequency and maximum amplitude.

In the modification shown in FIG. 4, the upper end of a magnetostrictive sleeve 18f' may also be attached by a threaded connection, brazing or bonding adhesive to a slightly enlarged boss portion 7c provided at the vibration output end of the connecting body 4c as shown in FIG. 4. The enlarged boss portion 7c of the connecting body 4c is thus located at a loop of longitudinal vibration L of the connecting body 4c, and vibrates in the longitudinal mode, and which in turn vibrates the magnetostrictive sleeve 18f' secured thereto in the longitudinal mode. The longitudinal vibrations of the magnetostrictive sleeve 18f' induce an electromotive force in the pick-up coil which surrounds the upper end of the magnetostrictive sleeve 18f' in the area of a loop of longitudinal vibrations therein, as injected into the sleeve 18f' by the enlarged boss portion 7c of the connecting body 4c to which it is attached.

The cone shaped housing 30f' as shown in FIG. 4, and which should be made of a non-conductive material, is somewhat longer than the cone-shaped housing 30f shown in FIG. 3, to permit attachment of the externally threaded end extension 34' of this nose cone to the tubular extension 12c' of the vibrator assembly casing 11c shown in FIG. 3. In the modification shown in FIG. 4, a permanent magnet ring 23 is supported on the inturned shoulder forming end portion 34 of the nose cone 30f', and which in turn supports a non-magnetic and non-conductive spacer ring 24, and the flanged spool 21 around whose tubular body 21' the pickup coil 20 is applied. A resilient and expansible clamping ring 35 overlaps the upper flange portion 21" of the pickup coil supporting spool 21, and expands into an adjacent circumferential groove formed in the inner surface of the nose cone housing 30f'. It will be noted that the pick-up coil 20, in the modification shown in FIG. 4, is positioned adjacent the upper end of the magnetostrictive sleeve 18f' forming a part of this sensing device 10f', and in the region of a loop of longitudinal vibration and maximum stress therein. The permanent magnet ring 23 at the lower end of this pick-up assembly serves to magnetize the magnetostrictive sleeve 18f' contained therein, and establishes magnetic lines of flux which flow through the magnetostrictive sleeve for substantially the full length thereof, and is thus magnetostrictively coupled with the coil 20.

Sensing devices made in accordance with this invention may also be associated with a vibrator assembly whose vibrator unit 1 longitudinally vibrates and simultaneously rotates to drive a suitable tool attached to the vibration output end of the vibrator unit, such as a milling cutter, or a boring, drilling, or reaming tool T, and which tool performs corresponding machining operations in hard materials as a result of the rotation and simultaneous vibration of the tool. A vibrator unit constructed similar to the vibrator unit 1 shown in FIG. 5 when properly mounted, may be simultaneously rotated and vibrated since the pick-up assembly of the sensing device 10e associated therewith may be made similar to the sensing device shown in FIGS. 1 and 2, and can be suspended from the lower end 11d' of the stationary casing 11d of the instrument, and would not interfere with the rotation of the vibrator unit.

Figure 5:
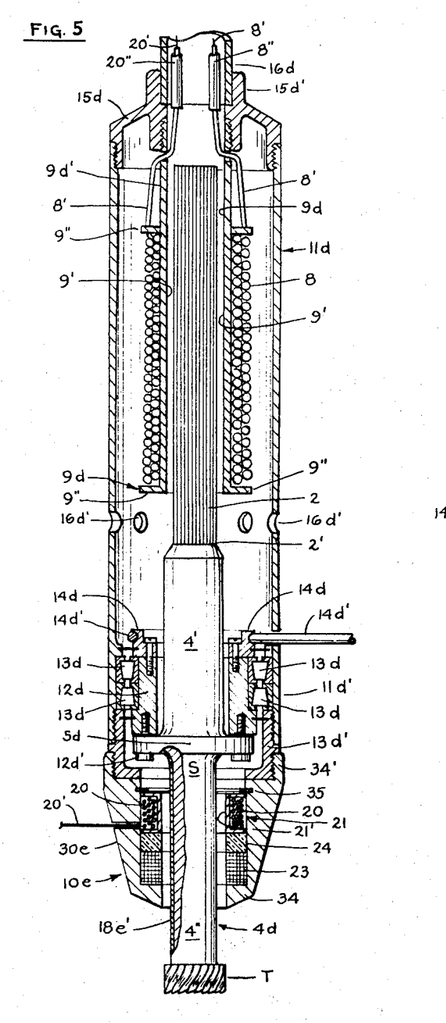
FIG. 5 is a longitudinal section of a further form of vibrator assembly whose vibrator unit and work tool is designed to rotate and simultaneously vibrate in the longitudinal mode, this view also showing a sensing device whose nose cone, pick-up coil, spacer ring and permanent magnet is made similar to that shown in FIGS. 1 and 2 and is detachably suspended from the lower end of the stationary casing of the instrument, and with the lower quarter wavelength section of its vibration transmitting tool holder having a magnetostrictive coating which serves as the magnetostrictive part or element of the sensing device, and which extends axially through the nose cone.

A simultaneously rotated and longitudinally vibrated vibrator unit 1 may be mounted for rotation by providing a vibrator assembly structure such as shown in FIG. 5. In this illustrative embodiment of the invention, the vibrator unit 1 embraces a transducer stack 2 rigidly bonded at one end by bonding joint 2' to a connecting body 4d and to whose vibration output end any form of rotated tool T such as a drilling, boring, reaming tool or milling cutter is secured, with or without the addition of an intervening tool holder, such as the tool holder 6c shown in FIG. 3. The tool supporting connecting body 4D and tool T attached thereto may have a longitudinal length corresponding to one-half wavelength of sound or integral multiples thereof traveling longitudinally through the material of the connecting body and tool, at the frequency of vibration of the transducer stack 2. The tool supporting connecting body 4d is provided with a nodal flange 5d which provides rotative support for the vibrator unit, and may be made to operate as an amplitude increasing acoustical impedance transformer by making its vibration input section 4' on one side of its nodal flange of larger mass than its vibration output section on the other side of its nodal flange.

The transducer stack 2 is energized to vibrate in the longitudinal mode by an energizing coil 8 whose winding leads 8' are connected to a biased high frequency alternating current generator so that the energizing coil 8 establishes a high frequency magnetic flux field axially through the transducer stack 2. The energizing coil 8 may be wound on the tubular body 9' of a winding spool 9d, but its tubular body 9' is sufficiently spaced from the transducer stack 2 to permit free rotation thereof. The winding supporting spool 9d may be provided with winding confining flange portion 9" and the spool may be supported in suspended position as hereafter explained.

This vibrator assembly also includes a stationary casing 11d which encloses the transducer stack 2 and the winding supporting spool 9d. An end closure 15d is threadably or otherwise removably connected to the upper end of the casing 11d. The casing 11d is also provided with a stationary lower end extension 11d' which provides support for a rotatable driving barrel 12d contained therein, and to whose lower end the nodal flange 5d of the vibrator unit is secured as by suitable screws 12d' which are rubber cushioned so that the radial vibrations of the nodal flange 5d are not transmitted to the rotatable driving barrel 14d. One or more thrust bearing assemblies 13d are positioned between the rotatable driving barrel 12d and the lower end extension 11d' of the casing 11d and are secured in position as by a bearing retainer ring 13d' which may be threadably secured to the lower end extension 11d' of the casing 11d. A ring-shaped pulley 14d is secured as by screws or bolts to the upper end of the rotatable driving barrel 12d. A drive belt 14d' is trained around the ring pulley 14d, extends through a slot in the stationary casing 11d, and thence is trained around a drive pulley driven by suitable exterior driving means such as gearing or an electric motor (not shown). As thus constructed, the vibrator unit 1 may be rotated at any desired rotative speed, and is free to simultaneously vibrate in the longitudinal mode, since its nodal flange 5d has substantially only a radial component of vibration which is absorbed by the resilient mounting which surrounds the securing screws 12d', and which nodal flange 5d has little or no vibration in the longitudinal mode.

The winding supporting spool 9d has an upper extension 9d' which may be suspended from the end closure 15d. The end closure 15d has an axially extending tubular section 15d' whose lower part provides a threaded tubular coupling to which the upper end of the tubular extension 9d' of the winding spool 9d may be detachably secured. The upper part of the tubular section 15d' also provides a tubular coupling to which the coolant supply tube 16d may be connected, and through which a gaseous coolant is introduced. The gaseous coolant enters the interior of the chamber defined by the casing 11d through slits or holes formed in the upper end extension 9d' of the winding spool 9d, flows around the transducer stack 2 and energizing winding 8 to cool the same; and warmed coolant escaping through holes 16d' in the lower end of the casing 11d.

The instrument shown in FIG. 5 may employ a sensing device 10e which may be similar to that shown in FIGS. 1 and 2, and which embraces a nose cone housing 30e which is threadably connected to and suspended from the lower end of the stationary retainer ring 13d' or from the lower end section 11d' of the stationary casing 11d of the instrument. The nose cone 30e of the instrument shown in FIG. 5 presents an inturned shoulder 34 which supports the permanent magnet 23, the spacer ring 24 and the winding spool 21 on which the pick-up coil 20 is wound; all locked in position by a snap ring 35. In this modification, the lower quarter wave length section 4" of the tool holder 4 has a core of high tensile strength and vibration transmitting capability and which may be made of magnetostrictive material, or which may have a magnetostrictive coating or plating 18e' which extends downwardly from the region of maximum stress S and which constitutes the magnetostrictive element of the sensing device 10e as shown in FIG. 5.

As shown in FIG. 5, the winding leads 8' encased in a suitable protective sheath 8" extend through the coolant supply tube 16d and are connected to an exterior oscillator generator which provides biased alternating current of predetermined frequency to the energizing coil 8, and which coil in turn generates a corresponding high frequency alternating magnetic field in the rotatable stack 2. The tool holder 4d and its associated magnetostrictive element 18e' is vibrated in the longitudinal mode by the energized and longitudinally vibrated transducer stack 2, and at the same frequency as the transducer stack. The pick-up coil 20 is positioned in adjacent relation to the region of maximum stress in the magnetostrictive member 18e' and in surrounding relation thereto, so that when the magnetostrictive member 18e' is vibrated, an electromotive force is induced in the pick-up coil 20, which is delivered to its winding leads 20'. The winding leads 20' may be encased in a protective sheath which extends to an external pick-up circuit having an amplitude indicating instrument associated therewith, or the pick-up leads 20' may form a part of an automatic tuning circuit which adjusts the frequency of a biased high frequency alternating current generator to thereby maintain the vibrator unit 1 at resonance frequency and maximum amplitude.

The permanent magnet 23 of the sensing device 16e shown in FIG. 5 magnetizes the magnetostrictive element 18e' so that magnetic lines of flux flow through the element 18e' for substantially the full length thereof. Longitudinal vibrations injected into the magnetostrictive element 18e' by, and at the same frequency as, the transducer stack 2 produce a region of high stress S in the element 18e' which is adjacent the pick-up coil 20. The resulting permeability variations at the region of high stress S in the polarized magnetostrictive element 18e induces an electromotive force in the adjacent pick-up coil 20 which is dependent upon the frequency and amplitude of vibration of the magnetostrictve element 18e' and which produces a corresponding alternating current in the pick-up leads 20', which is measured by the amplitude indicating instrument associated with the pick-up circuit, or which automatically manipulates the oscillator circuit of the generator to correspondingly regulate the frequency of its biased alternating output current which flows to the transducer coil 8, and so that the transducer stack 2 and the entire vibrator unit 1 operates at resonance frequency and maximum amplitude.

Figure 6:
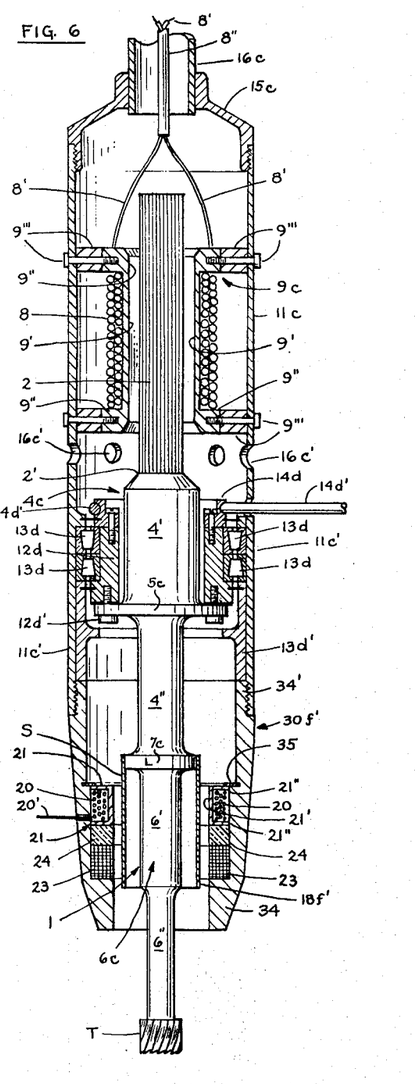
FIG. 6 is a longitudinal section of the vibrator assembly shown in FIGS. 3 and 4 which has been modified to incorporate the provision of means for rotatably supporting its vibrator unit and work tool so that the work tool may be rotated and simultaneously vibrated in the longitudinal mode, and whose pick-up assembly is positioned below the rotatable supporting means and suspended from the lower end of the instrument casing.

The vibrator assembly shown in FIGS. 3 and 4, may also be provided with means for longitudinally vibrating and simultaneously rotating its vibrator unit 1 and thus smultaneously vtbrate and rotate a milling cutter, or a boring, drilling or reaming tool T fixed to the work performing output end thereof, as illustrated in FIG. 6. To avoid repetition, those components of the modification shown in FIG. 6 which are similar to like components of the vibrator assembly shown in FIGS. 3 and 4 and heretofor fully described, and identified by similar numerals, will not be further described.

In the modification shown in FIG. 6, its stationary casing 11c has a stationary lower end extension 11c' which provides support for a rotatable driving barrel 12d contained therein. The nodal flange 5c of the vibrator unit is secured as by rubber cushioned screws 12d' to the rotatable driving barrel 12d. One or more thrust bearing assemblies 13d are positioned between the rotatable driving barrel 12d and the lower end extension 11c' of the casing 11c and are secured in position as by a bearing retainer ring 13d' which may be threadably secured to the lower end extension 11c' of the casing 11c.

A ring-shaped pulley 14d is secured as by screws or bolts to the upper end of the rotatable driving barrel 12d. A drive belt 14d' is trained around the ring pulley 14d, extends through a slot in the stationary casing 11c, and thence is trained around a drive pulley driven by suitable exterior driving means such as gearing or an electric motor (not shown). As thus constructed, the vibrator unit 1 may be rotated at any desired rotative speed, and is free to simultaneously vibrate in the longitudinal mode, since its nodal flange 5c has substantially only a radial component of vibration which is absorbed by the resilient mounting which surrounds the securing screws 12d', and which nodal flange 5c has little or no vibration in the longitudinal mode.

The connecting body 4c shown in FIG. 6 may have a tool holder 6c attached to the vibration output end thereof. A magnetostrictive sleeve 18f' may be attached to the shoulder formation 7c located at a loop L of longitudinal vibration of the tool holder 4c (as in FIGS. 4 and 6). The nose cone housing 30f' forming a part of the surrounding pick-up assembly is provided with an externally threaded extension 34' which is removably secured to the end extension 11c' of the stationary casing 11c as shown in FIG. 6. The upper end of a magnetostrictive sleeve 18f' may be attached by a threaded connection, or by brazing or bonding adhesive to a slightly enlarged boss portion 7c provided at the vibration output end of the connecting body 4c as shown in FIG. 6. The enlarged boss portion 7c of the connecting body 4c is thus located at a loop of longitudinal vibration of the connecting body 4c, and vibrates in the longitudinal mode, and which in turn vibrates the magnetostrictive sleeve 18f' secured thereto in the longitudinal mode. The longitudinal vibrations of the magnetostrictive sleeve 18f' induce an electromotive force in the pick-up coil which surrounds the upper end of the magnetostrictive sleeve 18f' in the area of a loop of longitudinal vibration therein, as injected into the sleeve 18f' by the enlarged boss portion 7c of the connecting body 4c to which it is attached.

The cone shaped housing 30f' as shown in FIG. 6 contains a permanent magnet ring 23 which is supported on the inturned shoulder forming end portion 34 of the nose cone 30f', and which in turn supports a non-magnetic and non-conductive spacer ring 24 and the flanged spool 21 around whose tubular body 21' the pick-up coil 20 is applied. A resilient and expansible clamping ring 35 overlaps the upper flange portion 21" of the pick-up coil supporting spool 21, and expands into an adjacent circumferential groove formed in the inner surface of the nose cone housing 30f'. It will be noted that the pick-up coil 20, in the modification shown in FIG. 6 is positioned adjacent the upper end of the magnetostrictive sleeve 18f' forming a part of this sensing device 10f', and in the region of a loop of longitudinal vibration and maximum stress therein. The permanent magnet ring 23 at the lower end of this pick-up assembly serves to magnetize the magnetostrictive sleeve 18f' contained therein, and establishes magnetic lines of flux which flow through the magnetostrictive sleeve for substantially the full length thereof, and is thus magnetostrictively coupled with the coil 20.

The vibrator assemblies illustrated in FIGS. 1 to 6 inclusive are particularly designed to be supported from a suitable bracket or supporting structure, and their vibrator units 1 may be designed to operate at frequencies in the order of 5 kc. to 50 kc., and dependent upon the work to be performed, may be made medium or large in size, and require an input current of 100 watts to 5,000 watts or more. Where the vibrator assembly is bracket supported, and not manually held and manipulated, the diametrical size, length and weight of the vibrator assembly is usually of secondary importance.

However, work-performing vibrator assemblies are also extensively used and designed for dental and surgical work, industrial applications or other work, and where the vibrator assembly is held in the hand of an operator and its work tool or element manually manipulated. Since the diametrical size, length and weight of hand manipulated vibrator assemblies is important for convenient hand manipulation of such vibrator assemblies, the hand held assembly should have an exterior diameter of not substantially exceeding one inch, and preferably less, should preferably have a length not exceeding eight to twelve inches and preferably less, and should be compactly made and relatively light in weight. Such hand manipulated vibrator assemblies usually operate at frequencies in the order of 20 kc. or above and require to 100 or 200 watts of input power or less, and are also preferably equipped with a sensing device which maintains its energized vibrating unit at resonance frequency and maximum amplitude.

Figure 7:
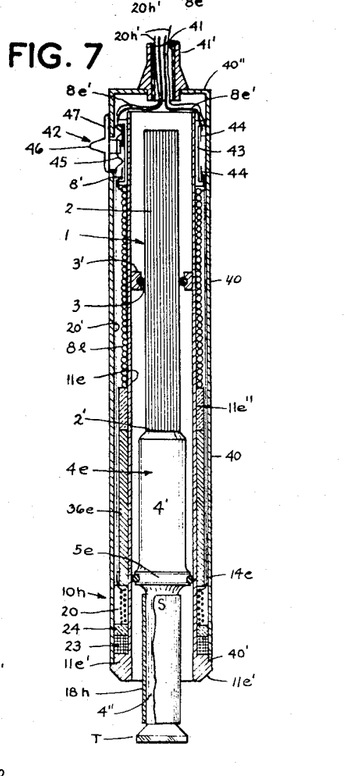
FIG. 7 is a longitudinal section of a further modified form of vibrator assembly with which a sensing device made in accordance with this invention may be associated, and wherein the magnetostrictive member of the sensing device may be provided by a magnetostrictive sleeve or layer of magnetostrictive material applied to the tool holder of the vibrator unit of the vibrator assembly, with the surrounding pick-up coil and permanent magnet of the sensing device supported by an end extension of the vibrator assembly casing and enclosed within the end extension of the protective jacket of the vibrator assembly.
Figure 8:
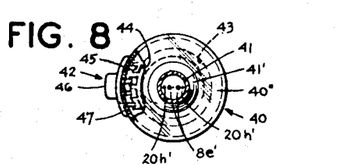
FIG. 8 is a plan view of the power input end of the vibrator assembly shown in FIG. 7.

A vibrator assembly as illustrated in FIGS. 7 and 8 is particularly designed to be held in the hand and manually manipulated. This vibrator assembly is compactly assembled with a minimum number of parts, whose over-all maximum diameter may be made one inch or less, and whose over-all length may be in the order of six to twelve inches, as determined by the frequency at which its vibrator unit is to be vibrated. The vibrator assembly as shown in FIGS. 7 and 8, has a vibrator unit composed of a magnetostrictive transducer 2 rigidly fixed at one end thereof by a bonding joint 2' to a connecting body 4e and to whose vibration output end the selected work tool T is secured. The connecting body 4e and tool T may have a combined longitudinal length aproximately corresponding to one-half wavelength of sound or integral multiples thereof traveling longitudinally through the material of these components. The connecting body 4e may be provided with a nodal flange 5e by means of which the vibrator unit 1 is supported, and the connecting body 4e may be designed as an amplitude increasing acoustical impedance transformer by making its vibration input section 4' on one side of its nodal flange 5e of larger mass than its vibration output section 4" on the other side of its nodal flange.

The vibrator unit 1 may be contained within a tubular casing 11e whose upper end extends to or beyond the upper free end of the transducer 1, and whose lower end terminates below the nodal flange 5e in a nose-shaped abutment portion 11e'. The nodal flange 5e of the vibrator unit 1 may be provided with a groove in which a resilient gasket or O-ring 14e is seated and which is in pressure bearing contact with the adjacent inner surface of the tubular casing 11e. A similar resilient ring or gasket 3 surrounds the transducer 2 at approximately a node of longitudinal vibration thereof, and may be supported by a boss portion 3' which may be fixed to or formed integral with the inner surface of the surrounding tubular casing 11e. The vibrator unit 1 is supported in axial alignment with the tubular casings 11e by the spaced resilient rings 3 and 14e and which are located at spaced nodes of longitudinal vibration of the vibrator unit and therefore do not impede or dampen its longitudinal vibrations. The spaced resilient O-rings 3 and 14e also absorb the radial vibrations of the vibrator unit which occur at the nodal areas thereof where the O-rings 3 and 14e are positioned, so that little or no vibrations are transmitted by the longitudinally vibrated vibrator unit 1 to the surrounding tubular casing 11e. As thus supported, the vibrator unit 1 can be withdrawn from and re-inserted into the casing 11e, and a vibrator unit having a tool T of different form attached thereto may be inserted into the surrounding tubular casing 11e in substitution for the vibrator unit and tool previously used.

The tubular casing 11e is formed of material which does not impede the passage of alternating magnetic flux therethrough, and accordingly, the transducer energizing winding 8e may be wound directly on the tubular casing 11e adjacent the intermediate section of the transducer 2. The energizing winding 8e is protectively enclosed by an outer tubular jacket 40 whose lower end portion 40' is supported by a shoulder formation presented by the nose portion 11e' of the inner tubular casing 11e. The upper end of the outer tubular jacket 40 may be provided with a closure forming end wall 40″ to which one end of a coolant supply tube 41 is connected as by a connecting nipple 41′. The coolant supplied by the coolant tube 41 flows within the inner tubular casing, around the transducer 2, through suitably spaced holes or apertures provided in the boss portion 3′ which supports the resilient transducer aligning gasket 3, and then around the vibration input section 4′ of the connecting body or tool holder 4e, and the warmed coolant may escape through holes or ports formed in the nodal flange 5e of the connecting body 4e. The stream of coolant also cools the tubular casing 11e and the energizing coil 8e as wound thereon. Additional coolant may be directed to flow through the passage defined between the tubular casing 11e and the tubular body of the outer jacket 40.

The sensing devices 10h associated with the vibrator assembly shown in FIG. 7 may comprise a magnetostrictive sensing tube or coating 18h applied to the outer surface of the vibration output section 4″ of the connecting body 4e. The upper end portion of the vibration output section 4″ of the connecting body 4e, which is adjacent and directly below the nodal flange 5e and has a reduced cross-section, is a region of high stress in the vibration output section 4″. The high stress exhibited at the upper end of the vibration output section 4″ is transmitted to the upper end of the magnetostrictive tube or coating 18h, and when the tube or coating 18h is also polarized and vibrated, the resultant mechanical impedance in the magnetostrictive tube or coating 18h, generates in the surrounding pick-up coil 20 an electromotive force corresponding to the mechanical impedance and the frequency and amplitude at which the magnetostrictive tube or coating 18h is vibrated.

Prior to application of the outer tubular jacket 40 and the energizing winding 8e to the tubular casing 11e, a permanent magnet ring 23 is longitudinally telescoped over the tubular casing 11e and driven into abutment against the inner face of the shoulder forming nose portion 11e′ of the casing 11e. A non-magnetic and non-conductive spacer ring 24 is then telescoped over the tubular casing 11e and driven into abutment against the permanent magnet ring 23. A flux shielding collar 36e, formed of copper or aluminum, is then telescoped over the tubular casing 11e, with its lower end sufficiently spaced from the spacer ring 24 to provide room for the application of a wound pick-up coil 20 of sufficient wound length for effective pick-up performance. The flux shielding collar 36e may be of substantial length, with its lower end positioned approximately adjacent the nodal flange 5e of the connecting body 4e and its upper end more or less coinciding with the lower end of the transducer 2. The flux shielding collar 36e prevents the alternating magnetic flux field which surrounds and travels through the transducer 2 and generated by the energized transducer winding 8e, from reaching or otherwise influencing the performance of the pick-up coil 20. The permanent magnet 23 of this sensing device magnetizes the magnetostrictive tube or coating 18h which extends therethrough, and produces a flow of magnetic flux longitudinally through the magnetostrictive tube or coating 18h which flows around the lower face of the permanent magnet 23 and the upper end of the pick-up coil 20. After the flux shielding collar 36e has been applied to the tubular casing 11e in the order above explained, the energizing winding 8e may be applied directly to the tubular casing 11e and to extend over a substantial mid-sectional length of the transducer 2. Since the transducer energizing winding 8e need extend only around the mid-section of the transducer 2, the casing 11e may present a winding confining flange portion or collar 11e″ telescoped thereover, and which is positioned between the upper end of the flux-shielding collar 36e and the lower end of the transducer energizing winding 8e, as shown in FIG. 7.

An on-off switch assembly 42 may be mounted on the upper end of the inner tubular casing 11e for controlling the flow of current to the transducer energizing coil 8e, or for separately or simultaneously controlling the operation of the exterior pick-up circuit. As shown in FIGS. 7 and 8, the switch assembly includes a tubular cage 43, formed of non-conductive and non-magnetic material, which may be telescoped over the upper end of the tubular casing 11e. It will be appreciated that the tubular cage 43 can be applied to the upper end of the tubular casing 11e before or after the energizing coil 8 is applied. The switch assembly 42 may also embrace four pairs of spaced contact rings or plates 44 supported within the switch cage 43. The winding leads 8′ from the transducer energizing coil are connected to a first pair of contact plates 44; and the pick-up leads 20′ extending from the pick-up coil 20 and threaded upwardly between the inner tubular casing 11e and the outer tubular jacket 40 are connected to a second pair of contact plates 44.

Power input leads 8e′, connected to the biased high frequency alternating current generator and threaded through the tube 41, and which provides the energizing power for the transducer winding 8e, are connected to a third pair of contact plates 44. Output pick-up leads 20h′ are connected to the fourth pair of contact plates 44, and are then continued through the tube 41 to form a part of an amplitude indicating circuit, or an automatic tuning circuit associated with the oscillator generator. The switch assembly 42 also includes a slidable non-conductive bridging member which presents four non-conductive prongs to which four elongated contact brushes 45 are secured, and which may remain in electrical contact with the four contact plates 44 to which the paired lead wires 8′ and 20′ are respectively connected. The bridging member which supports the four contact brushes 45 may be slidably manipulated by a slide button 46 exteriorly of the vibrator assembly jacket 40, and which has an inwardly extending stud portion extending through an elongated slot in the jacket 40 and then secured to the bridging member whose non-conductive prongs support the four contact brushes 45. The slide button 46 may be slidably supported and guided by a boss portion 47 formed integral with the jacket 40, and which has a corresponding slot through which the inwardly extending stud portion of the slide button extends. By slidably manipulating the slide button 46, the four elongated contact brushes 45 may be moved into bridging contact with the four contact plates 44 to which the power input leads 8e′ and output pick-up leads 20h′ are secured. It will be appreciated that other forms of switch assemblies than the one above-described may be used to provide an adjustable bridging connection between the power wires 8′ leading to the energizing coil 8e and the power input leads 8e′ connected to the generator, and for providing an adjustable bridging connection between the leads 20′ extending from the pick-up coil 20 and the output pick-up leads 20h′ leading to the amplitude indicating or tuning circuit.

The vibrator assembly and associated sensing device 10h as shown in FIGS. 7 and 8 may be compactly made and thus conveniently hand held and hand manipulated. Its vibrator unit may also be made as an integral insert and made interchangeable with similar vibrator unit inserts. Suitable means may be provided for properly locating the vibrator unit insert within the inner tubular casing 11e, and for also preventing rotative movement of the vibrator unit insert 1 within the casing 11e, as by making the nodal flange 5e and the surrounding resilient gasket 14h of polygonal form, and providing the adjacent inside surface of the tubular casing 11e with a correspondingly shaped polygonal seat for the nodal flange 5e and its resilient gasket 14e. While the vibrator assembly shown in FIGS. 7 and 8 may be made small in size and light in weight for convenient hand manipulation, it will be appreciated that this vibrator assembly may also be made of larger size and power for industrial applications, and supported by a suitable bracket fixture.

Sensing device characteristics

When the sensing devices made in accordance with this invention, and generally designated by numeral 10 and which incorporate a magnetostrictive member or element generally designated 18, which is one-half wavelength long at the frequency of vibration of the vibration transmitting component of the vibrator unit to which it is attached, the magnetostrictive member is tuned to the resonance frequency of the vibration transmitting component to which it is secured and whose amplitude of vibrations are to be sensed. A tuned magnetostrictive member can be secured to a vibrated part of the work-performing vibrator unit at a loop of longitudinal vibration or a loop of radial vibration of the vibrated part as heretofore explained.

A half wavelength or tuned magnetostrictive member or element, regardless of its cross-sectional size and physical length, has the advantage that it imposes a minimal loading on the vibration transmitting component to which it is secured. A tuned magnetostrictive member also results in the production of an electromotive force or signal in the surrounding pickup coil 20 of relatively large magnitude, which corresponds to the resonance frequency and maximum amplitude of vibration of that part of the vibrator unit to which it is secured, and the magnified electromotive force or signal produced in the surrounding pick-up coil 20 may be directly employed for operating an amplitude indicating meter, or for automatically tuning the oscillator generator, without the use of a preamplifier, or the use of a relatively small pre-amplifier, to amplify the electromotive force generated by the pick-up coil. Also, when a tuned or half wavelength magnetostrictive member is used, the pick-up coil 20 may be adjusted in position to and from the nodal region of maximum stress S, which occurs at the midsection of the half wavelength magnetostrictive member, or its position may be adjusted to and from a loop of longitudinal vibration of the half wavelength magnetostrictive member, which occurs adjacent the upper and lower ends thereof, to thereby vary the strength of the electromotive force generated by the pick-up coil 20 from a higher value to a lower value, or vice versa.

A practical exemplification of a half wavelength magnetostrictive member is illustrated in FIG. 1, and wherein the half wavelength tool holder 6b, which provides a vibration transmitting component between the connecting body 4b and tool T, is composed on a magnetostrictive material such as nickel, permendur, permanickel or a nickel alloy and which thus also serves as a half wavelength magnetostrictive element 18e of the sensing device 10e. Alternatively, the core 6b' of the half wavelength tool holder or vibration transmitting component may be made of a non-magnetostrictive but high tensile strength and effecient vibration transmitting material as shown in FIG. 2, with the non-magnetostrictive tool holder core 6b' coated or encased in a half wavelength magnetostrictive coating or plating 18e' for the full length thereof, and which serves as the half wavelength magnetostrictive element 18e' of the sensing device 10e.

When the tuned or half wavelength magnetostrictive member is made in the form of a magnetostrictive tube 18f as in the sensing device 10g illustrated in FIG. 3; the magnetostrictive member 18f may be made one-half wavelength along and thus embrace the desirable attributes of a half wavelength and tuned magnestotrictive member as above explained. However, when a tuned or half wavelength magnetostrictive tube is used as a part of the sensing device, it may have a structural length which is three or more inches long at frequency ranges below 30 kc., and thus may be too long for convenient association with the vibrator assembly, or for association with the vibrator unit and motion transmitting component thereof whose frequency and amplitude of vibration are to be sensed.

Where a tuned or half wavelength magnetostrictive member of element cannot be conveniently used, the magneotstrictive member may be made less than one-half wavelength long or less than one-fourth wavelength long as is the magnetostrictive tube 18f' exemplified in FIG. 4. The magnetostrictive tube 18f is non-resonant at the frequency of vibration, and imposes a load on the component or part of the vibrator unit to which it is secured. To hold such loading to a minimum, the non-resonant magnetostrictive member or element should desirably be small in mass, and have the smallest practical length and cross-section, sufficient only to accommodate the surrounding pick-up assembly.

Figure 9:
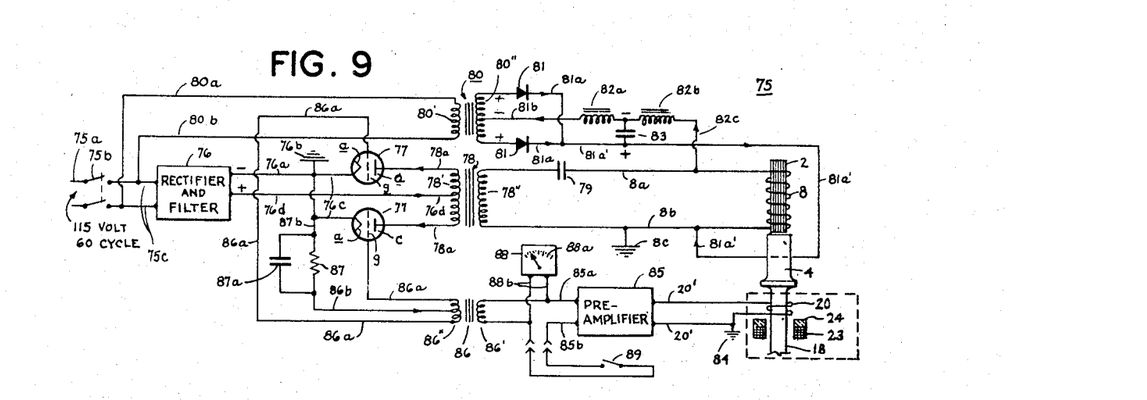
FIG. 9 is a triode tube circuit diagram designed for association with the sensing devices of this invention and which is operative to automatically adjust the transducer energizing power circuit in a manner to automatically maintain the vibrator unit at resonance frequency and maximum amplitude.
Figure 10:
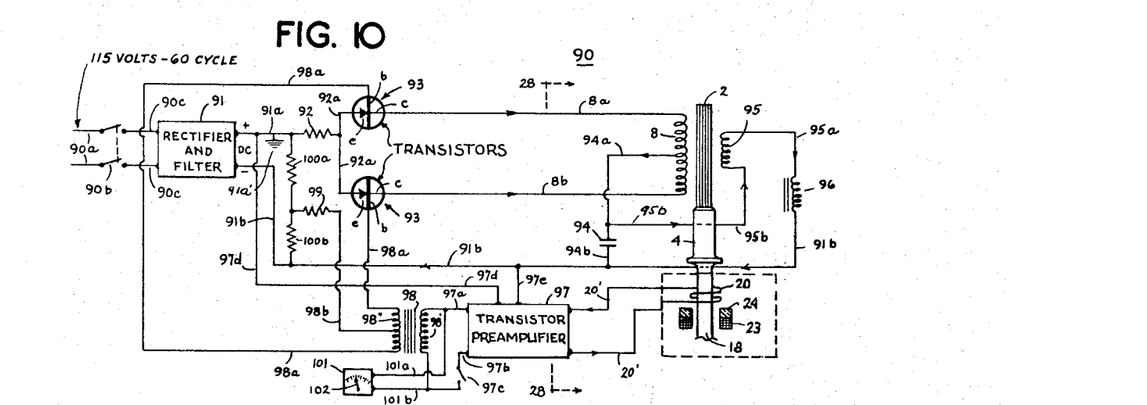
FIG. 10 is a transistorized circuit diagram designed for association with the sensing devices of this invention and which is operative to automatically adjust the transducer energizing power circuit in a manner to maintain the vibrator unit at resonance frequency and maximum amplitude.
Figure 11:
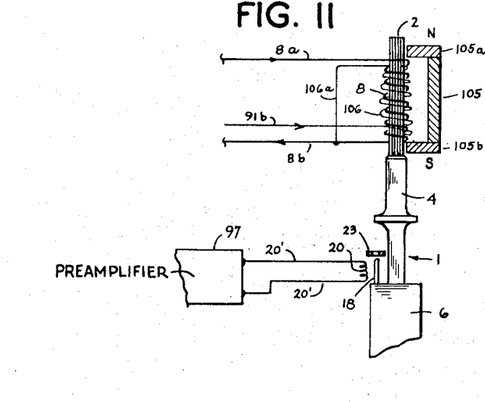
FIGS. 11 and 12 are diagrammatic illustrations of a partial modification of the transistorized circuit diagarm shown in FIG. 10.

A non-resonant magnetostrictive member, such as the tube 18f, or $18f_1$, as illustrated in FIGS. 3 and 4, exhibits a region of maximum stress S adjacent its point of attachment to the vibration transmitting component 4c or 6c of the vibrator unit, and the pick-up coil 20 should be positioned adjacent this region of maximum stress. Magnetostrictive members 18f or 18f' which are non-resonant at the frequencies at which they are vibrated by the vibration transmitting component of the vibrator unit to which they are secured, can be selectively applied to vibration transmitting components which vibrate below 30 kc. and as low as 5 kc. or even below. When a non-resonant magnetostrictive member is vibrated by the part of the vibrator unit to which it is secured, the electromotive force induced in the surrounding pick-up coil 20 is relatively low in value, so that its power output fed into its output leads 20' may not be of sufficient magnitude and may require pre-amplification in order to operate an amplitude indicating meter, or to automatically adjust the tuning means of the generator circuit to the resonance frequency of the vibrator unit as illustrated in FIGS. 9, 10, and 11.

However, non-resonant magnetostrictive members or elements which are less than one-half wavelength long, should nevertheless have a sufficient structural length to accommodate the pick-up assembly of the sensing device as telescoped thereover, and for this purpose can be made less than two inches in longitudinal length, and even less than one inch in length. Thus, the magnetostrictive tube 18f shown in FIG. 3 and the magnetostrictive tube 18f' shown in FIG. 4, may be made less than one-half wavelength long and thus non-resonant at the operating frequency; and such lengths are preferably used where a shortened and non-resonant magnetostrictive member or element can best accommodate the vibrator assembly, vibrator unit or motion transmitting component of the vibrator unit, with which it is associated. Since the pick-up assembly of the sensing device need not be substantially more than one inch in longitudinal length, the magnetostrictive member associated therewith may have an approximately corresponding length.

The wavelength of sound traveling longitudinally through the material of a magnetostrictive member or element is dependent upon the acoustical properties of the material of the member or element, and the frequency at which it is vibrated. For example, assuming that a sound wave will travel longitudinally through a selected magnetostrictive material at a speed of 180,000 inches per second, as an approximate average; the wavelength may then be computed by dividing the speed of sound in inches per second traveling through the material of the member, by the frequency per second at which the magnetostrictive member is vibrated. Assuming that a sound or acoustical wave travels longitudinally through the material of a magnetostrictive member at the rate of 180,000 inches per second, fractional wavelengths of magnetostrictive members vibrating at different frequencies may be computed.

When the work-performing vibrator unit vibrates at frequencies of 50 kc. and above, the magnetostrictive member or element in the form of a tube attached at one end thereof to the vibration transmiting component of the vibrator unit, would have a structural length of approximately 1.5 inches when made one-half wavelength long, and which half wavelength member or element may be sufficiently short in structural length to be conveniently accommodated by the vibrator unit 1 and vibrator assembly with which it is associated.

However, when the vibrator unit vibrates at about 40 kc. or below, a half wavelength magnetostrictive member or element in the form of a tube secured at one end thereof to a vibration transmitting component of the vibrator unit, may be too long to be accommodated by the vibrator assembly and the vibrator unit to which it is attached, and can then be made less han onte-half wavelenth long, and thus non-resonant at the frequency of vibration. However, the non-resonant magnetostrictive member or element when formed as a tube, should be more than one-fourth wavelength or less than one-fourth wave-length long, since vibrations induced in a one-fourth wavelength magnetostrictive member or element produce a region of such high stress as to subject the member or element to possible fracture.

Since the non-resonant member or element in the form of a tube, imposes undesirable loading on the vibrator unit to which it is attached, which may cause a variation in its resonance frequency and maximum amplitude, the non-resonant member or element should accordingly possess the smallest practical mass, with resultant minimal loading of the vibrator unit, by making its cross-section sufficient only to achieve adequate structural strength, and by making its longitudinal length as short as possible, and sufficient only to accommodate a miniature but adequate pick-up assembly as telescoped thereover, and which longitudinal length may be in the order of approximately one inch.

As may be computed from the above formula, a magnetostrictive member or element in the form of a tube vibrated at about 40 kc. may be approximately three-eighths of a wavelength long; a magnetostrictive member or element vibrated at about 30 kc. may be in the order of three-sixteenths to one-eighth of a wavelength long; a magnetostrictive member or element vibrated at approximately 25 kc. may be approximately one-eighth of a wavelength long; a magnetostrictive member or element vibrated about 20 kc. may be in the order of one-eighth to three thirty-seconds of a wavelength long; a magnetostrictive member or element vibrated at about 15 kc. may be in the order of three thirty-seconds to one-sixteenth of a wavelength long; a magnetostrictive member or element vibrated at about 10 kc. may be in the order of approximately one sixteenth to one thirty-second of a wavelength long; and a magnetostrictive member or element vibrated at 5 kc. may be less than one thirty-second of a wavelength long. Thus, non-resonant magnetostrictive members or elements may be selectively used which have a structural length sufficient to effectively cooperate with a pick-up assembly telescoped thereover, and which pick-up assembly may have a longitudinal length which is approximately only one inch or less, and which also best accommodates various vibrator assemblies and vibrator units operating over a wide range of frequencies.

The selected non-resonant magnetostrictive member 18f or 18f' which is less than one-half wavelength long, must not only be of sufficient structural length to accommodate the pick-up assembly, but must also be sufficiently short to accommodate the vibrator unit and vibrator assembly with which it is associated; and in addition must be structurally rigid and strong to resist fracture and meet permissible peak stress requirements, sensitively responsive to vibration, strongly polarizable, and possess the ability to induce a relatively strong signal in the surrounding pick-up coil 20.

The magnitude of the electromotive force induced in the pick-up coil 20, is dependent upon the degree of alteration of the magnetic field established in the region of maximum stress S of the polarized magnetostrictive member in response to the transmission of vibrational energy thereto, and at which region of maximum stress the pick-up coil 20 should desirably be located. The pick-up coil 20 may be adjusted to proper inductance, which will result in the generation of maximum electromotive force, by applying a proper number of turns of pick-up wire to the winding supporting tube or spool during assembly manufacture of the pick-up coil as determined by available inductance measuring instruments. The tube or spool which supports the pick-up coil should be made of a non-magnetic material which does not impede the passage of magnetic flux between the pick-up coil and the magnetostrictive member projecting axially therethrough, and when the pick-up winding supporting spool or tube is thus made, the tubular body of the spool or tube may have a bore which loosely receives the magnetostrictive member or element, as illustrated in the accompanying drawings. The permanent magnet ring 23 is preferably spaced from the pick-up coil 20, as by a non-magnetic and non-conductive spacer ring 24 with the permanent magnet ring 23 and spacer ring 24 in axial alignment with the pick-up coil 20. The magnetic flux field produced by the permanent magnet travels between and around the permanent magnet ring and pick-up coil and longitudinally through the magnetostrictive member or element to thereby polarize the member or element of the sensing device.

The sensing devices of this invention, as heretofore described, are particularly designed for association with an oscillator generator and tuning circuit and which operates to adjust the oscillator generator into frequency match with the resonance frequency of the work-performing vibrator unit and thereby assure maximum work performance by the vibrator unit. Where heavy duty vibrator units are employed, which require a high power input to the transducer winding 8 as in the order of 200 watts to 5,000 watts or higher, the oscillator generator preferably embraces two or more triodes which convert normal line current into the desired high frequency alternating current used to energize the transducer winding. However, where relatively low power is required to energize the transducer winding 8 as in the nature of 200 watts or below, the generator oscillator may embrace transistors which convert normal line current into high frequency alternating current to power the transducer winding.

FIG. 9 discloses a circuit diagram 75 which embraces an oscillator generator circuit having triodes 77 for converting line current into high frequency alternating current which powers the transducer winding, in combination with a sensing circuit associated with one of the sensing devices of this invention, and which operates to automatically tune the generator oscillator circuit to the resonance frequency of vibration of the vibrator unit, and whose energizing winding 8 is supplied with the high frequency alternating current supplied by the oscillator circuit of the generator. As shown in FIG. 9, electrical power, such as normal 115 volt 60 cycle alternating line current, is supplied by power leads 75a through an on–off switch 75b to the power intake lines 75c of a rectifier and filter 76 of the generator circuit. The minus side of the high voltage direct current output from rectifier 76 is transmitted by line 76a, which is grounded at 76b, by branch lines 76c to the cathodes c of two or more triode oscillators 77. The plus side of the direct current produced by the rectifier and filter 76, is connected by tap conductor 76d to the center of the primary winding 78' of a transformer 78, and the lead ends 78a of the primary winding 78' of the transformer 78 are in turn connected to the anodes a of the triode oscillators 77. The secondary winding 78" of the transformer 78 is connected in circuit to the leads 8a and 8b of the transducer winding 8, with a blocking capacitor 79 inserted in transducer winding lead 8a in a position between the secondary winding 78" of the transformer 78 and the transducer winding 8.

To provide a direct current bias for the transducer winding 8, normal line current, such as 115 volt, 60 cycle alternating current, may be tapped as by conductors 80a and 80b which are connected to the primary winding 80' of a second transformer 80. The end leads of the secondary winding 80" of the second transformer 80 are connected to a pair of rectifiers 81. The plus DC output lines 81a from the rectifiers 81 are joined together and continued as line 81a' for connection to the winding lead 8b of the transducer winding 8, and with the lead winding 8b grounded as at 8c, as shown in FIG. 9. The secondary winding 80" of the second transformer 80 is centrally tapped by a plus direct current line 81b and then connected to a pair of chokes 82a–82b linked in series. The output line 82c of the second choke 82b is connected to the lead line 8a of the transformer winding 8, and between the transformer winding 8 and the blocking capacitor 79. A second capacitor 83 is connected to the continuation output line 81a' extending from the rectifiers 81, to that section of the tap line 81b which extends between the first choke 82a and second choke 82b, and whose function is to reduce the ripple of the DC current. The blocking capacitor 79, operating in conjunction with the chokes 82a and 82b and the second capacitor 83 connected therebetween, prevents the flow of DC current from line 82a to the main transformer 78, so that biasing direct current flows from the rectifiers 81 only into the transducer winding 8.

The small but nevertheless measurable electromotive force or voltage induced in the pick-up coil 20 by the polarized and vibrated magnetostrictive element 18 of the sensing device (and which may be polarized by a permanent magnet 23 as heretofore explained, and diagrammatically illustrated in FIG. 9) is fed into the input of amplifier 85 via the leads 20'. After grounding one of the pick-up leads 20' as at 84, the pick-up leads 20' are connected to a pre-amplifier 85 which magnifies the electromotive force or electrical power generated by the pick-up coil 20, as induced by the vibration of the polarized magnetostrictive element 18. The magnified output current from the pre-amplifier 85, is fed into the pre-amplifier output lines 85a and 85b which are connected to the ends of the primary winding 86' of a third transformer 86 which closes the regenerative loop required for automatic frequency control.

The ends of the secondary winding 86" of the transformer 86, which forms a part of the feedback circuit, are connected by lines 86a to the grids g of the triode oscillators 77, as shown in FIG. 9. The secondary winding 86" of the transformer 86 is also center tapped by line 86b and which is in turn connected by line 87b to the branch input lines 76c which carry the current coming from the cathodes c of the triodes 77. A resistor 87 and associated capacitor 87a are connected in parallel to tap line 86b and line 87b and serve to generate a negative voltage so that the grids g of the triode 77 have a lower voltage than the cathodes c of the triodes.

A voltmeter 83 may be connected by lines 88b across the output lines 85a–85b of the pre-amplifier 85, and the voltmeter 88 may be instrumented and provided with an amplitude indicator 88a, which indicates the amplitude of vibration of the magnetostrictive element 18 of the sensing device and the vibration transmitting component 4 or 6 of the vibrator unit 1 to which the sensing element 18 is connected or associated. If desired, a remote control switch 89 may be provided for cutting off the power to the primary winding 86' of the transformer 86 of the tuning circuit.

The sensing and tuning circuits above described influence the operation of the triodes 77 forming a part of a regeneration circuit, so that the biased high frequency alternating current supplied to the transducer winding 8 is tuned to match the mechanical resonance frequency of vibration of the vibrator unit 1. This relatively simple sensing circuit is designed for association with any one of the sensing devices heretofore described and operates to effectively and reliably tune the high frequency alternating current output from the oscillator circuit as supplied to the transducer winding 8. Tuning of the oscillator circuit into frequency match with the resonance frequency of the vibrator unit is automatically assured without the attention of the operator while using the vibrator unit in performing useful work. However, as shown in FIG. 9, and above explained, a voltmeter 88 having a calibrated amplitude indicating instrument 88a associated therewith, and connected to the output lines 85a and 85b of the pre-amplifier 85 of the sensing circuit, may be additionally provided. It will also be appreciated that the sensing circuit and associated voltmeter 88 and amplitude indicator 88A may be operated separately, without automatic tuning tie-in with the oscillator circuit, and in which case the generator circuit (after adding a frequency tunable adjustable oscillator) would be manually tuned by the operator in accordance with the amplitude indications on the amplitude indiactor instrument 88a.

FIG. 10 is a circuit diagram designated 90 which illustrates a transistorized generator circuit, sensing circuit and self-tuning circuit combination which can be used where transistor oscillators generate sufficient high frequency alternating current power for the transducer winding 8 to efficiently vibrate the work-performing vibrator unit 1 at resonance frequency. Such transistor oscillators are now being made which will convert as much as 200 watts of input line current into transducer energizing high frequency alternating current, and continuing improvement of transistor oscillators may make them capable of efficiently generating even high input power for the transducer. Transistorized oscillator circuits are simpler, less complicated and less costly to manufacture than tube type oscillator circuits, and are preferably used where the power demand can be satisfied by a transistorized oscillator generator.

The transistorized generator circuit, as shown in FIG. 10, receives line current, such as 115 volt, 60 cycle alternating current, from line current input lines 90a, and which preferably has an on-off switch 90b associated therewith which is connected to the power input leads 90c of a rectifier and filter 91. The plus DC output line 91a from the rectifier and the filter 91, after grounding as at 91a', has a protective resistor 92 connected in series thereto, and which resistor 92 is connected by branch input lines 92a to the emitters e of two or more transistors 93. The collectors c of the transistors 93 are connected to the winding leads 8a and 8b of the transducer energizing winding 8 as illustrated in FIG. 10. The transducer winding 8 is supplied by winding leads 8a and 8b with high frequency alternating current at a frequency which will cause the transducer 2 and the entire vibrator unit 1 to vibrate at resonance frequency and maximum amplitude. The transducer energizing winding 8 is centrally tapped by a tap conductor 94a which is connected to one side of a by-pass capacitor 94, and to one end of polarizing coil 95. The other side of the by-pass capacitor 94 is connected by line 94b to the negative DC line 91b extending from the rectifier and filter 91.

To supply a polarizing field for the transducer 2, the negative lead 91b from the rectifier and filter 91 is also connected in series to a choke 96 which is in turn connected to the polarizing coil 95 which supplies the biasing field to the transducer 8. The other end of the polarizing coil 95 is connected by line 95b to the center tap lead 94a of the transducer energizing coil 8.

The generator-oscillator circuit as above described establishes through the windings 8 and 95 a biased high frequency alternating magnetic field through the transducer 2 for substantially the full length thereof, and which causes the half wavelength transducer 2 to vibrate in the longitudinal mode. The vibrated transducer 2 injects its vibrations longitudinally through the connecting body 4 and tool or tool holder 6 of the vibrator unit, and in a manner to cause the entire vibrator unit 1 as well as the vibration transmitting component 4 or tool holder 6 to vibrate at resonance frequency and maximum amplitude. To automatically maintain the generator oscillator circuit and the associated transducer windings 8 and 95 in frequency match with the resonance frequency and maximum amplitude of vibration of the vibrator unit 1, a sensing circuit is provided as shown in FIG. 10. The magnetostrictive member or element 18, fixed to the vibration transmitting component 4 or 6 of the vibrator unit 1 at a loop of longitudinal vibration or a loop of radial vibration thereof, is suitably polarized as by a permanent magnet 23. The polarized magnetostrictive member 18, as vibrated by the vibration transmitting component 6 of the vibrator unit, induces in the pick-up coil 20 of the pick-up assembly of the sensing device a small but nevertheless measureable voltage which is supplied to the output leads 20′ of the pick-up coil 20. The power flow through the output leads 20′ of the pick-up coil 20 is preferably amplified by a pre-amplifier 97 which may be transistorized to reduce its size. The output leads 97a and 97b from the pre-amplifier 97 are connected to the ends of the primary winding 98′ of a transformer 98 which forms a part of the feedback circuit. The pre-amplifier 97 draws its power from the output of the rectifier and filter 91a via line 91b and 97e, and line 91 and 97d.

The secondary winding 98″ of the transformer 98 of the feedback circuit has its ends connected by conductors 98a to the base electrodes b of the push-pull transistor amplifiers 93. A pair of voltage dividing resistors 100a and 100b are connected in series to the output lines 91a and 91b of the rectifier and filter 91. A protective resistor 99 is connected between the voltage dividing resistors 100a and 100b and connected by tap line 98b to the center of the secondary winding 98′ of the transformer 98 which forms a part of this regenerative circuit. Thus, the current flowing from the pick-up coil 20 of the sensing device through its output leads 20′, as amplified by the transistor amplifier 97, which is in turn connected through the transformer 98 to the base electrodes b of the transistors 93, controls the conductivity of the transistors 93, and operates to automatically adjust the frequency of the alternating current supplied to the transducer winding 8 into frequency match with the resonance frequency of vibration of the vibrator unit 1.

A voltmeter 101, instrumented to provide an amplitude indicator 102, may be connected by lines 101a and 101b to the pre-amplifier output lines 97a and 97b. One end of the primary winding 98′ of the tuning circuit transformer 98 is connected to line 101b leading to the voltmeter 101. By this circuit, a readable indication can be obtained of the amplitude of vibration of the magnetostrictive element 18 and the vibration transmitting component 4 or 6 of the vibrator unit 1 with which it is associated. If desired, on-off switch 97c may be positioned between the pre-amplifier output line 97b and the line 101b leading to the voltmeter 101.

Figure 12:
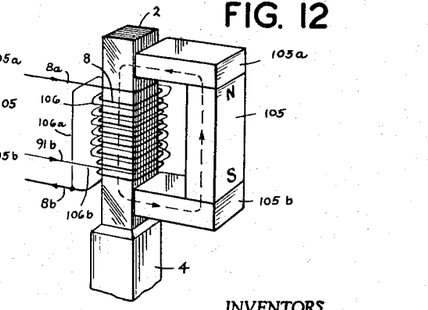

Those parts 94, 95 and 96 of the transistorized generator circuit shown in FIG. 10, may be deleted by using a permanent magnet 105 and associated polarizing coil 106 as shown in FIGS. 11 and 12, and which would permit elimination of the choke 96, direct current biasing coil 95, and blocking condenser 94 from the circuit shown in FIG. 10. In the modification shown in FIGS. 11 and 12, a permanent magnet 105 is combined with pole pieces 105a and 105b whose ends are positioned in substantially abutting relation to the opposite ends of the transducer 2, and preferably the pole pieces 105a and 105b in actual practice would lightly touch the opposite ends of the transducer 2. The energizing winding 8 is wound around the transducer 2 and between the pole pieces 105a and 105b of the permanent magnet 105, with the ends of the transducer energizing coil 8 connected by the winding leads 8a and 8b to the collectors c of the transistors 93, as shown at the lefthand side of FIG. 10.

A direct current winding 106 may be wound around the transducer energizing coil 8, with one end 106b of the coil 106 connected to the minus DC current output line 91b extending from the rectifier and filter 91. The other end of the coil 106 is connected by line 106a to the winding lead 8b of the transducer energizing coil. The superimposed winding 106, operating in conjunction with the permanent magnet 105, polarizes the transducer 2 for substantially the full length thereof, and thus serves to bias the high frequency alternating magnetic field flowing longitudinally through the transducer 2, and which field is circulated through the pole pieces 105a and 105b and the permanent magnet 105 extending therebetween. The coils 8 and 106 shown in FIGS. 10 and 11, and only schematically drawn, are in surrounding relation to the transducer stack 2. For improved efficiency it is desirable that the individual coils 8 and 106 cover about seventy five percent of the length of the transducer stack 2, as shown in FIGS. 11 and 12.

By modifying the right-hand side of the generator circuit as shown in FIG. 10 in the respects indicated in FIGS. 11 and 12, certain components of the oscillator circuit as shown in the right-hand side of FIG. 10 may be dispensed with, and a highly effective biased high frequency magnetic field is supplied to the transducer which sets it into longitudinal vibration. In the modified circuit shown in FIGS. 11 and 12, the sensing circuit and tuning circuit, and that part of the oscillator generator circuit positioned on the left-hand side of FIG. 10, would not be otherwise modified.

The transistorized sensing and feedback circuits disclosed in FIGS. 10, 11 and 12 and above described, influence the operation of the transistors 93 forming a part of the generator circuit, so that the high frequency alternating current supplied to the transducer winding 8 is tuned to match the known resonance frequency of vibration of the vibrator unit 1. This relatively simple sensing circuit is designed for association with any one of the sensing devices heretofore described, and operates to effectively and reliably tune the high frequency alternating current output from the oscillator circuit as supplied to the transducer winding 8. Tuning of the oscillator circuit into frequency match with the resonance frequency of the vibrator unit is automatically assured without the attention of the operator while using the vibrator unit in performing useful work. However, as shown in FIG. 10, and above explained, a voltmeter 101 having a calibrated amplitude indicating instrument 102 associated therewith, and connected to the output lines 97a and 97b of the pre-amplifier 97 of the sensing circuit, may be additionally provided. It will also be appreciated that the sensing circuit and associated voltmeter 101 and amplitude indicator 102 may be operated separately, without automatic tuning tie-in with the oscillator circuit, and in which case the generator oscillator circuit, supplemented by a tunable oscillator, would be manually tuned by the operator in accordance with the amplitude indications on the amplitude indicator instrument 102.

By following the teachings of this invention, sensing devices, as exemplified in the accompanying drawings, and heretofore described, can be designed and adapted to numerous and various forms of vibrator assemblies and work-performing vibrator units, and which will accommodate substantially all structural and operating conditions. Selected sensing devices made in accordance with this invention can be applied to vibrator units at locations which do not interfere with the normal manipulation or operation of the work-performing vibrator unit to which it is applied, and which does not interfere with or obstruct the ready insertion and re-applcation of the vibrator units from their vibrator assemblies, even though the vibrator units are rotated as well as longitudinally vibrated. These sensing devices are particularly adapted to be joined in circuit with oscillator generator or regenerative circuits, to thereby automatically maintain the oscillator circuit in frequency match with the resonance frequency of vibration of the vibrator unit. These sensing devices and associated circuits, may assume various forms which best accommodate the particular hand-held or bracket-supported vibrator assembly, and permits the operator to give his whole and undivided attention to the performance of useful work, under conditions of peak working efficiency of the vibrator unit without tuning attention.

While certain novel features of this invention have been disclosed herein and are pointed out in the claims, it will be understood that various omissions, substitutions and changes may be made by those skilled in the art without departing from the spirit of this invention.

What is claimed is:

1. A vibrator assembly including in combination; a work performing vibrator unit which presents a transducer component and a work tool component designed to perform useful work which is rigidly joined to said transducer component by a vibration transmitting component and which together provide a vibrator unit designed to vibrate at a predetermined resonance frequency when the transducer component is energized by a surrounding alternating magnetic field of corresponding frequency a stationary casing containing said transducer component and a portion of the vibration transmitting component of said vibrator unit, means associated with said casing for supporting said vibrator unit at a node of longitudinal vibration thereof, and a high frequency alternating current winding contained within and supported by said casing and positioned in surrounding relation to said transducer component and operative when energized to establish an alternating magnetic field in surrounding relation to said transducer component whose frequency substantially corresponds to the resonance frequency of vibration of said work performing vibrator unit; and a device for sensing variations in the frequency and amplitude of vibration of said work performing vibrator unit when vibrated, said device including, an elongated magnetostrictive element fixed to said vibration transmitting component and extending substantially parallel thereto and whereby said element is vibrated at a frequency and amplitude of vibration of that region of the vibration transmitting component at which said element is fixed, a pick-up assembly adjacent said magnetostrictive element which includes a pick-up coil, and means for polarizing said magnetostrictive element, and means forming a tubular extension of said casing for containing and supporting said pick-up coil in telescoped position with respect to said magnetostrictive element and in spaced relation to said vibration transmitting component; said pick-up coil being operative to generate an electromotive force as induced therein by the vibrations of said polarized magnetostrictive element, whose magnitude varies in accordance with the variations in amplitude of vibration of the vibrator unit at the region thereof at which said magnetostrictive element is secured thereto.

2. A vibrator assembly as defined in claim 1, and wherein said polarizing means comprises a permanent magnet ring positioned in surrounding relation to said magnetostrictive element and which is operative to polarize said magnetostrictive element, and a non-magnetc and non-conductive spacer ring in surrounding relation to said magnetostrictive element and positioned between said pick-up coil and permanent magnet ring, said pick-up coil, spacer ring and permanent magnet ring being supported in surrounding relation to said magnetostrictive element by the tubular extension of said casing.

3. A vibrator assembly as defined in claim 1, and wherein said vibration transmitting component presents at least an outer surface portion thereof formed of magnetostrictive material, and which magnetostrictive portion provides the magnetostrictive element of said sensing device.

4. A vibrator assembly as defined in claim 1, and wherein said vibration transmitting component has a longitudinal portion of reduced cross section and which is formed of magnetostrictive material, said magnetostrictive longitudinal portion providing the magnetostrictive element of said sensing device.

5. A vibrator assembly as defined in claim 1, and where said vibration transmitting component has a longitudinal portion of reduced cross section, at least said longitudinal portion of the vibration transmitting component being covered with a magnetostrictive material which provides the magnetostrictive element of said sensing device.

6. A vibrator assembly as defined in claim 1, and wherein said magnetostrictive element of the sensing device is in the form of an elongated magnetostrictive tube presenting a free end and having means at the opposite end thereof for rigidly securing said magnetostrictive tube to said vibration transmitting component and in surrounding relation thereto and whereby said tube is vibrated at a frequency and amplitude of vibration of that region of said vibration transmitting component to which said tube is fixed, said magnetostrictive tube having a longitudinal length which is less than one-half wave length of sound traveling through said tube when mechanically vibrated by said unit at the resonance frequency for which the unit is designed, said magnetostrictive tube having a relatively small cross-sectional area and a relatively small mass as compared to the vibration transmitting component to which it is secured and whereby said tube does not materially alter the normal resonance frequency or amplitude of vibration of said component.

7. A vibrator assembly as defined in claim 1, and wherein the tubular extension of said casing is in the form of a nose cone detachably secured to the adjacent end of said casing, said nose cone supporting said pick-up coil in telescoped position with respect to said magnetostrictive element and in spaced relation to said vibration transmitting component.

8. A vibrator assembly including in combination; a work performing vibrator unit which presents a transducer component and a work tool component designed to perform useful work which is rigidly joined to said transducer component by a vibration transmitting component and which together provide a vibrator unit designed to vibrate at a predetermined resonance frequency when the transducer component is energized by a surrounding alternating magnetic field of corresponding frequency, a stationary casing containing said transducer component and a portion of the vibration transmitting component of said vibrator unit, means associated with said casing for supporting said vibrator unit at a node of longitudinal vibration thereof, and a high frequency alternating current winding contained within and supported by said casing and positioned in surrounding relation to said transducer component and operative when energized to establish an alternating magnetic field in surrounding relation to said transducer component whose frequency substantially corresponds to the resonance frequency of vibration of said work performing vibrator unit; and a device for sensing variations in the frequency and amplitude of vibration of said work performing vibrator unit when vibrated, said device including an elongated magnetostrictive element presented by at least an outer surface portion of said vibration transmitting component and whereby said element is vibrated at the frequency and amplitude of vibration of that region of the vibration transmitting component at which said element is fixed, a pick-up assembly telescoped over said magnetostrictive element which includes a pick-up coil surrounding a region of maximum stress in said element when vibrated, a permanent magnet ring positioned in surrounding relation to said magnetostrictive element and which is operative to polarize said element, a non-magnetic and non-conductive spacer ring in surrounding relation to said magnetostrictive element and positioned between said pickup-coil and permanent magnet ring, and means forming a tubular extension of said casing and which contains and supports said pick-up coil, spacer ring and permanent magnet ring in surrounding spaced relation to said magnetostrictive element and in a manner independently of said magnetostrictive element and the vibration transmitting component with which it is associated; said pick-up coil being operative to generate an electromotive force, as induced therein by the vibrations of said polarized magnetostrictive member, whose magnitude varies in accordance with the variations in amplitude of vibration of the vibrator unit at the region thereof at which said magnetostrictive member is secured thereto.

9. A vibrator assembly including in combination; a work performing vibrator unit which presents a transducer component and a work tool component designed to perform useful work which is rigidly joined to said transducer component by a vibration transmitting component and which together provide a vibrator unit designed to vibrate at a predetermined resonance frequency when the transducer component is energized by a surrounding alternating magnetic field of corresponding frequency, a stationary casing containing said transducer component and a portion of the vibration transmitting component of said vibrator unit, means associated with said casing for supporting said vibrator unit at a node of longitudinal vibration thereof, and a high frequency alternating current winding contained within and supported by said casing and positioned in surrounding relation to said transducer component and operative when energized to establish an alternating magnetic field in surrounding relation to said transducer component whose frequency substantially corresponds to the resonance frequency of vibration of said work performing vibrator unit; and a device for sensing variations in the frequency and amplitude of vibration of said work performing vibrator unit when vibrated, said device including an elongated magnetostrictive tube presenting a free end and having means at the opposite end thereof for rigidly securing said magnetostrictive tube to said vibration transmitting component and in surrounding relation thereto and whereby said tube is vibrated at the frequency and amplitude of vibration of that region of the vibration transmitting component at which said tube is fixed, said magnetostrictive tube having a longitudinal length which is less than one-half wave length of sound traveling through said tube when mechanically vibrated by said unit at the resonance frequency for which the unit is designed, said magnetostrictive tube having a relatively small cross-sectional area and a relatively small mass as compared to the vibration transmitting component to which it is secured and whereby said member does not materially alter the normal resonance frequency or amplitude of vibration of said component, a pick-up assembly telescoped over said magnetostrictive tube which includes a pick-up coil surrounding a region of maximum stress in said tube when vibrated, a permanent magnet ring positioned in surrounding relation to said magnetostrictive tube and adjacent the free end thereof and which is operative to polarize said magnetostrictive tube, and a non-magnetic and non-conductive spacer ring in surrounding relation to said magnetostrictive tube and positioned between said pick-up coil and permanent magnet ring, and means forming a tubular extension of said casing which contains and supports said pick-up coil, spacer ring and permanent magnet ring in surrounding spaced relation to said magnetostrictive tube and in a manner independently of said magnetostrictive tube and the vibration transmitting component with which it is associated; said pick-up coil being operative to generate an electromotive force, as induced therein by the vibrations of said polarized magnetostrictive tube, whose magnitude varies in accordance with the variations in amplitude of vibration of the vibrator unit at the region thereof at which said magnetostrictive tube is secured thereto.

10. A vibrator assembly including in combination; a work performing vibrator unit which presents a tranducer component and a work tool component designed to perform useful work which is rigidly joined to said transducer component by a vibration transmitting component and which together provide a vibrator unit designed to vibrate at a predetermined resonance frequency when the transducer component is energized by a surrounding alternating magnetic field of corresponding frequency, an inner stationary casing formed of a material which does not impede the passage of magnetic flux therethrough and which contains said transducer component and a substantial portion of the vibration transmitted component of said vibrator unit, means associated with said inner casing for supporting said vibrator unit at a node of longitudinal vibration thereof, and a high frequency alternating current winding wound on said inner casing and positioned in surrounding relation to said transducer component and operative when energized to establish an alternating magnetic field in surrounding relation to said transducer component whose frequency substantially corresponds to the resonance frequency of vibration of said work performing vibrator unit; and a device for sensing variations in the frequency and amplitude of vibration of said work performing vibrator unit when vibrated, said device including an elongated magnetostrictive element presented by at least an outer surface portion of said vibration transmitting component and whereby said member is vibrated at the frequency and amplitude of vibration of that region of the vibration transmitting component at which said element is fixed, a pick-up assembly telescoped over said magnetostrictive element which includes a pick-up coil surrounding a region of maximum stress in said element when vibrated, a permanent magnet ring positioned in surrounding relation to said magnetostrictive element and which is operative to polarize said element, and a non-magnetic and non-conductive spacer ring in surrounding relation to said magnetostrictive element and positioned between said pick-up coil and permanent magnet ring; said pick-up coil, spacer ring and permanent magnet ring being telescoped over and supported by an end extension of said inner casing and in a manner independently of said magnetostrictive tube and the vibration transmitting component with which it is associated, a flux shielding collar telescoped over said inner casing and interposed between said transducer energizing winding and said pick-up assembly, and an outer protective jacket surrounding and enclosing said transducer winding, flux shielding collar and pick-up assembly; said pick-up coil being operative to generate an electromotive force, as induced therein by the vibrations of said polarized magnetostrictive element, whose magnitude varies in accordance with the variations in amplitude of vibration of the vibrator unit at the region thereof at which said magnetostrictive element is secured thereto.

11. A vibrator assembly including in combination; a rotatable work performing vibrator unit which presents a transducer component and a work tool component designed to perform useful work which is rigidly joined to said transducer component by a vibration transmitting component and which together provide a vibrator unit designed to vibrate at a predetermined resonance frequency when the transducer component is energized by a surrounding alternating magnetic field of corresponding frequency, a stationary casing containing said transducer component and a portion of the vibration transmitting component of said vibrator unit, means for rotatably supporting said vibrator unit adjacent a node of longitudinal vibration thereof, and a high frequency alternating current winding contained within and supported by said stationary casing and positioned in surrounding relation to said transducer component and operative when energized to establish an alternating magnetic field in surrounding relation to said transducer component whose frequency substantially corresponds to the resonance frequency of vibration of said work performing vibrator unit; and a device for sensing variations in the frequency of vibration of said work performing vibrator unit when vibrated, said device including, an elongated magnetostrictive element fixed to said vibration transmitting component and extending substantially parallel thereto and whereby said element is vibrated at the frequency of vibration of the transmitting component to which said element is fixed, a stationary pick-up assembly adjacent said magnetostrictive element which includes a pick-up coil in surrounding relation to said element, means for polarizing said magnetostrictive element, and stationary means forming a tubular extension of said casing for containing and supporting said pick-up coil in telescoped position with respect to said magnetostrictive element and in spaced relation to said vibration transmitting component; said pick-up coil being operative to generate an electromotive force as induced therein by the vibrations of said polarized magnetostrictive element whose magnitude varies in accordance with the variations in vibration stresses produced in said magnetostrictive element in the region thereof which is adjacent to said pick-up coil.

12. A vibrator assembly including in combination; a rotatable work performing vibrator unit which presents a transducer component and a work tool component designed to perform useful work which is rigidly joined to said transducer component by a vibration transmitting component and which together provide a vibrator unit designed to vibrate at a predetermined resonance frequency when the transducer component is energized by a surrounding alternating magnetic field of corresponding frequency, a stationary casing containing said transducer component and a portion of the vibration transmitting component of said vibrator unit, means for rotatably supporting said vibrator unit adjacent a node of longitudinal vibration thereof, and a high frequency alternating current winding contained within and supported by said stationary casing and positioned in surrounding relation to said transducer component and operative when energized to establish an alternating magnetic field in surrounding relation to said transducer component whose frequency substantially corresponds to the resonance frequency of vibration of said work performing vibrator unit; and a device for sensing variations in the frequency of vibration of said work performing vibrator unit when vibrated, said device including, an elongated magnetostrictive tube surrounding a section of said vibration transmitting component and extending substantially parallel thereto, said magnetostrictive tube being fixed at one end thereof to said vibration transmitting component in the area of a loop of longitudinal vibration of said component and whereby said tube is vibrated at the frequency of vibration of the transmitting component to which said tube is fixed, a pick-up assembly adjacent said magnetostrictive tube which includes a pick-up coil in surrounding relation to said tube, means for polarizing said magnetostrictive tube, and stationary means forming a tubular extension of said casing for containing and supporting said pick-up coil in telescoped position with respect to said magnetostrictive tube and in spaced relation thereto; said pick-up coil being operative to generate an electromotive force as induced therein by the vibrations of said polarized magnetostrictive tube whose magnitude varies in accordance with the variations in vibration stresses produced in said magnetostrictive tube in the region thereof which is adjacent to said pick-up coil.

References Cited
UNITED STATES PATENTS

| | | | |
|---|---|---|---|
| 2,806,328 | 9/1957 | Bradfield | 310—26 X |
| 2,917,691 | 12/1959 | De Prisco et al. | 318—118 |
| 2,995,689 | 8/1961 | Scarpa | 318—118 X |

J. D. MILLER, *Primary Examiner.*

D. F. DUGGAN, *Assistant Examiner.*

U.S. Cl. X.R.

51—59; 310—26